(12) United States Patent
Kandekar et al.

(10) Patent No.: US 9,203,793 B2
(45) Date of Patent: Dec. 1, 2015

(54) AD-HOC MICRO-BLOGGING GROUPS

(75) Inventors: Kunal Kandekar, Jersey City, NJ (US); Steven L. Petersen, Los Gatos, CA (US)

(73) Assignee: WALDECK TECHNOLOGY, LLC, Wilmington, DE (US)

( * ) Notice: Subject to any disclaimer, the term of this patent is extended or adjusted under 35 U.S.C. 154(b) by 360 days.

(21) Appl. No.: 13/037,546

(22) Filed: Mar. 1, 2011

(65) Prior Publication Data
US 2012/0066312 A1 Mar. 15, 2012

Related U.S. Application Data

(60) Provisional application No. 61/309,903, filed on Mar. 3, 2010.

(51) Int. Cl.
| | |
|---|---|
| G06F 15/16 | (2006.01) |
| H04L 12/58 | (2006.01) |
| G06F 17/30 | (2006.01) |
| H04L 29/08 | (2006.01) |
| G06Q 50/00 | (2012.01) |

(52) U.S. Cl.
CPC .......... H04L 51/20 (2013.01); G06F 17/30017 (2013.01); G06F 17/3087 (2013.01); G06F 17/30144 (2013.01); G06F 17/30185 (2013.01); G06F 17/30206 (2013.01); H04L 51/32 (2013.01); H04L 67/22 (2013.01); G06Q 50/01 (2013.01)

(58) Field of Classification Search
CPC ........ G06Q 50/01; H04L 51/32; H04L 51/20; H04L 67/22; G06F 17/3087; G06F 17/30144; G06F 17/30206; G06F 17/30185; G06F 17/30017

USPC .......................................... 709/205; 707/723
See application file for complete search history.

(56) References Cited

U.S. PATENT DOCUMENTS

| | | | |
|---|---|---|---|
| 7,423,580 | B2 | 9/2008 | Markhovsky et al. |
| 7,787,886 | B2 | 8/2010 | Markhovsky et al. |
| 7,809,805 | B2 * | 10/2010 | Stremel et al. ................. 709/219 |
| 8,073,474 | B1 * | 12/2011 | Cooley et al. ................... 455/466 |
| 8,200,247 | B1 * | 6/2012 | Starenky et al. ........... 455/456.3 |
| 8,208,943 | B2 | 6/2012 | Petersen et al. |

(Continued)

FOREIGN PATENT DOCUMENTS

| | | |
|---|---|---|
| WO | 2009149063 A1 | 12/2009 |
| WO | 2010116371 A1 | 10/2010 |

OTHER PUBLICATIONS

Roger V. Skalbeck. (Aug. 27, 2009 ). Re-Hashing the Hash Tag—Crowd Competition and Community Standards at the #AALL2009 Conference. In LLRX.com. Retrieved Dec. 13, 2012, from http://www.llrx.com/features/twitter.htm.*

(Continued)

*Primary Examiner* — Brian J Gillis
*Assistant Examiner* — Juan C Turriate Gastulo

(57) ABSTRACT

Systems and methods are disclosed for distributing micro-blog posts to ad-hoc micro-blogging groups. In one embodiment, a micro-blog post of a user is obtained. A crowd in which the user is located is determined, where the crowd is a group of spatially proximate users. The micro-blog post of the user is tagged with a crowd identifier of the crowd in which the user is located such that the micro-blog post includes a crowd identifier tag. Publication of the micro-blog post including the crowd identifier tag is then effected.

24 Claims, 27 Drawing Sheets

(56) References Cited

U.S. PATENT DOCUMENTS

| | | | |
|---|---|---|---|
| 2007/0075898 | A1 | 4/2007 | Markhovsky et al. |
| 2007/0208802 | A1* | 9/2007 | Barman et al. ............... 709/203 |
| 2008/0005227 | A1 | 1/2008 | Subbian |
| 2008/0126476 | A1 | 5/2008 | Nicholas et al. |
| 2008/0215623 | A1 | 9/2008 | Ramer et al. |
| 2008/0294663 | A1 | 11/2008 | Heinley et al. |
| 2009/0115617 | A1* | 5/2009 | Sano et al. ............... 340/573.1 |
| 2009/0276500 | A1 | 11/2009 | Karmarkar |
| 2009/0287783 | A1* | 11/2009 | Beare et al. ............... 709/206 |
| 2010/0088187 | A1 | 4/2010 | Courtney et al. |
| 2010/0197318 | A1 | 8/2010 | Petersen et al. |
| 2010/0197319 | A1 | 8/2010 | Petersen et al. |
| 2010/0198826 | A1 | 8/2010 | Petersen et al. |
| 2010/0198828 | A1 | 8/2010 | Petersen et al. |
| 2010/0198862 | A1 | 8/2010 | Jennings et al. |
| 2010/0198869 | A1 | 8/2010 | Kalaboukis et al. |
| 2010/0198870 | A1 | 8/2010 | Petersen et al. |
| 2010/0198917 | A1 | 8/2010 | Petersen et al. |
| 2010/0199188 | A1 | 8/2010 | Abu-Hakima et al. |
| 2010/0211868 | A1 | 8/2010 | Karmarkar et al. |
| 2011/0055723 | A1* | 3/2011 | Lightstone et al. ........... 715/752 |
| 2011/0161427 | A1 | 6/2011 | Fortin et al. |
| 2012/0041983 | A1* | 2/2012 | Jennings ................ 707/784 |

OTHER PUBLICATIONS

Demirbas, M. et al., "Crowd-Sourced Sensing and Collaboration Using Twitter," In Proceedings of WOWMOM Symposium, Jun. 14-17, 2010, Montreal, Canada, found at <http://www.cse.buffalo.edu/~mbayir/papers/crowdsource.pdf>, 9 pages.

Joly, A. et al., "Contextual Recommendation of Social Updates, a Tag-based Framework," International Conference on Active Media Technology (AMT'10), Toronto, Canada, Aug. 28-30, 2010, found at <http://liris.cnrs.fr/Documents/Liris-4747.pdf>, 12 pages.

Vihavainen et al., "'I can't lie anymore!': The Implications of Location Automation for Mobile Social Applications," Proceedings of MobiQuitous 2009, Jul. 13-16, 2009, Toronto, Canada, IEEE Press, found at <https://hiit.fi/~svihavai/vihavainen_oulasvirta_sarvas_mobiquitous09.pdf>, 10 pages.

Bales, Elizabeth, "Noncommand Interfaces for Communication Technology in Mobile Settings," retrieved on Oct. 25, 2010 at <http://cseweb.ucsd.edu/users/earrowsm/bales.pdf>, 12 pages.

"Twibes," at <http://blog.twibes.com/twitter-tools/what-is-a-twibe>, dated Jul. 9, 2009, copyright 2009, Twibes.com, printed Nov. 14, 2012, 3 pages.

* cited by examiner

AD-HOC MICRO-BLOGGING GROUPS

RELATED APPLICATIONS

This application claims the benefit of provisional patent application Ser. No. 61/309,903, filed Mar. 3, 2010, the disclosure of which is hereby incorporated herein by reference in its entirety.

FIELD OF THE DISCLOSURE

The present disclosure relates to micro-blog posts and more specifically relates to tagging micro-blog posts with crowd identifiers of crowds of users in which originators of the micro-blog posts are located.

BACKGROUND

Publish-subscribe micro-blogging services, such as the Twitter® micro-blogging and social networking service, have become extremely popular. However, current publish-subscribe micro-blogging services do not support many-to-many ad-hoc micro-blogging groups. As such, there is a need for a system and method of providing many-to-many ad-hoc micro-blogging groups.

SUMMARY

Systems and methods are disclosed for distributing micro-blog posts to ad-hoc micro-blogging groups. In one embodiment, a micro-blog post of a user is obtained. A crowd in which the user is located is determined, where the crowd is a group of spatially proximate users. The micro-blog post of the user is tagged with a crowd identifier of the crowd in which the user is located such that the micro-blog post includes a crowd identifier tag. Publication of the micro-blog post including the crowd identifier tag is then effected.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
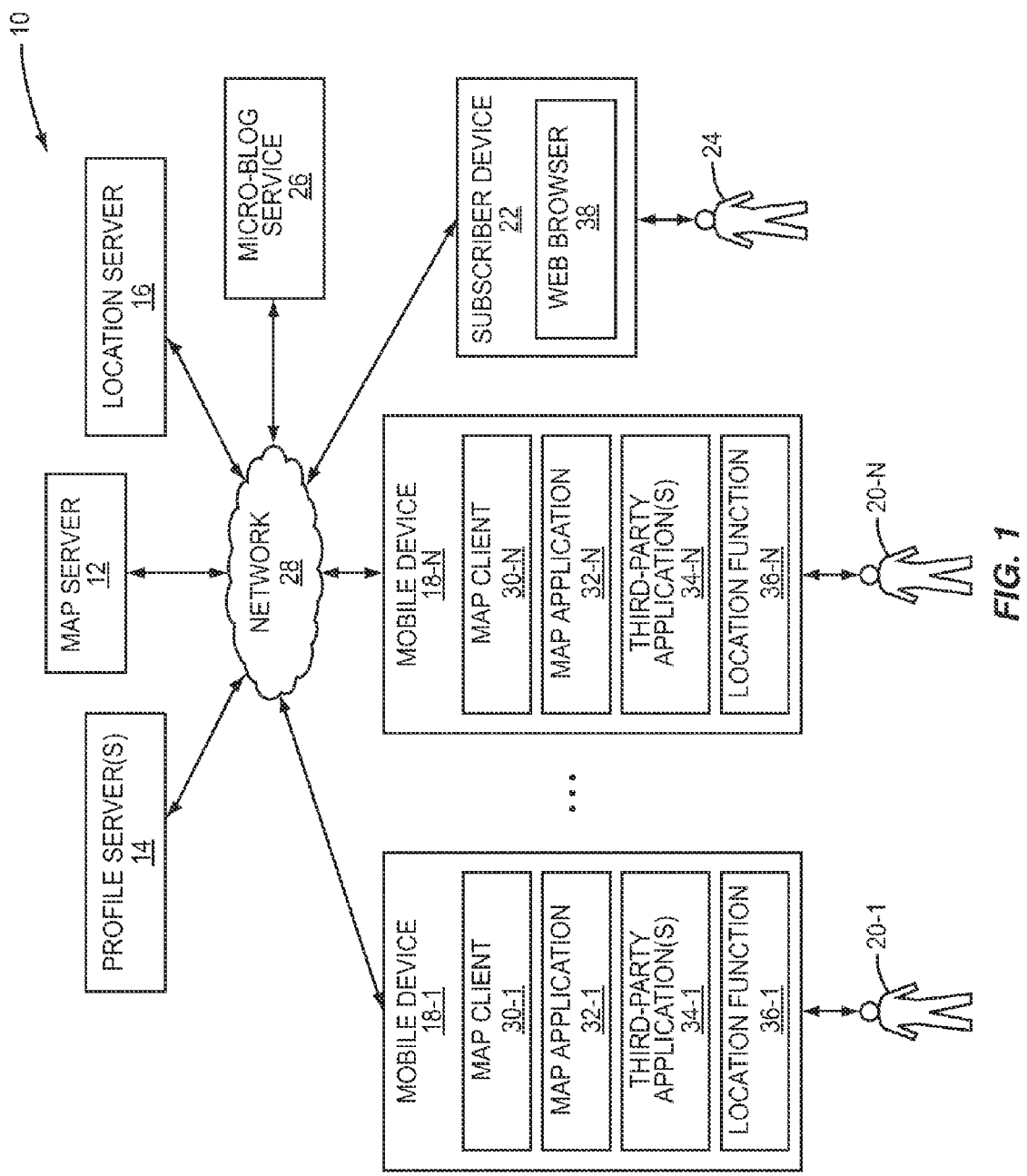
FIG. 1 illustrates a Mobile Aggregate Profile (MAP) system according to one embodiment of the present disclosure.
Figure 10:
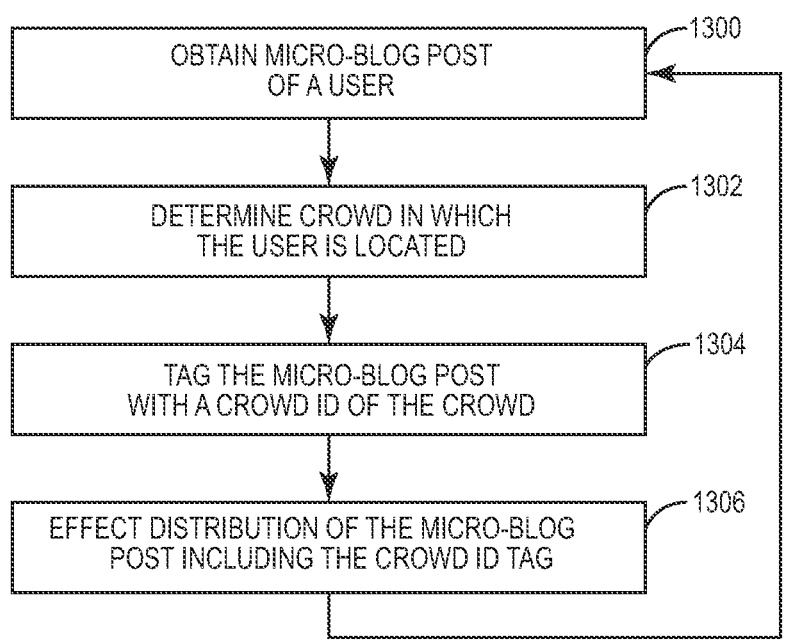
Figure 11:
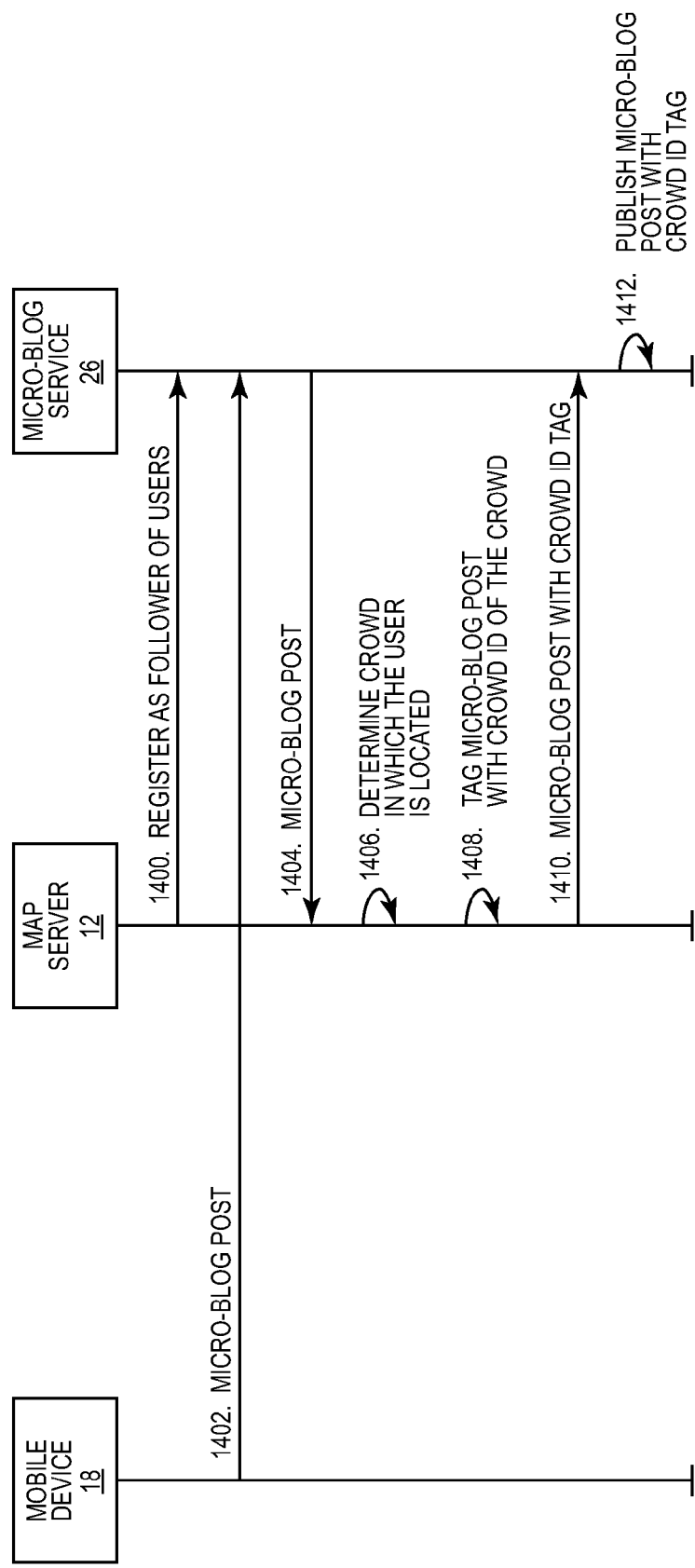
Figure 12:
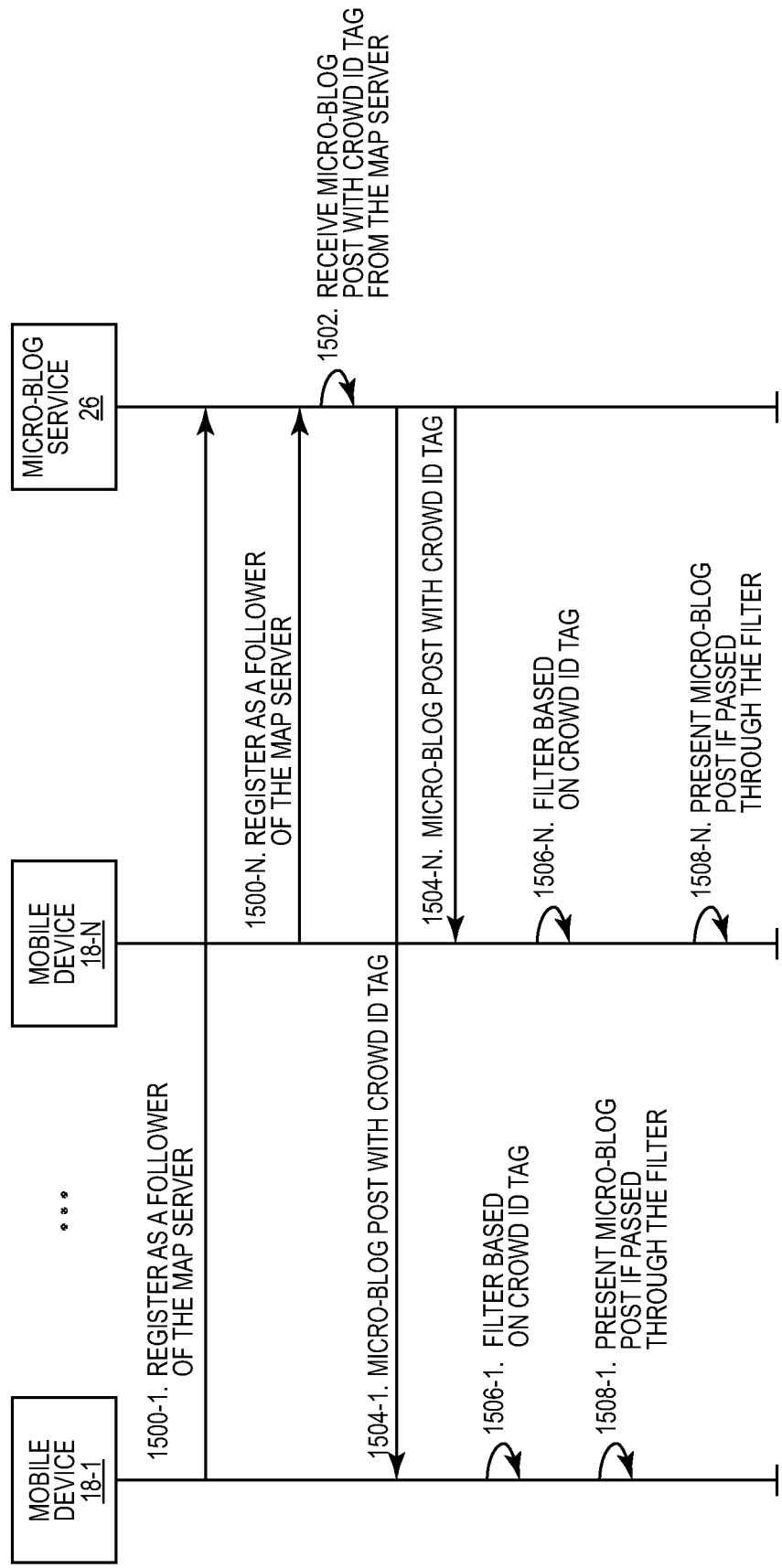
Figure 13:
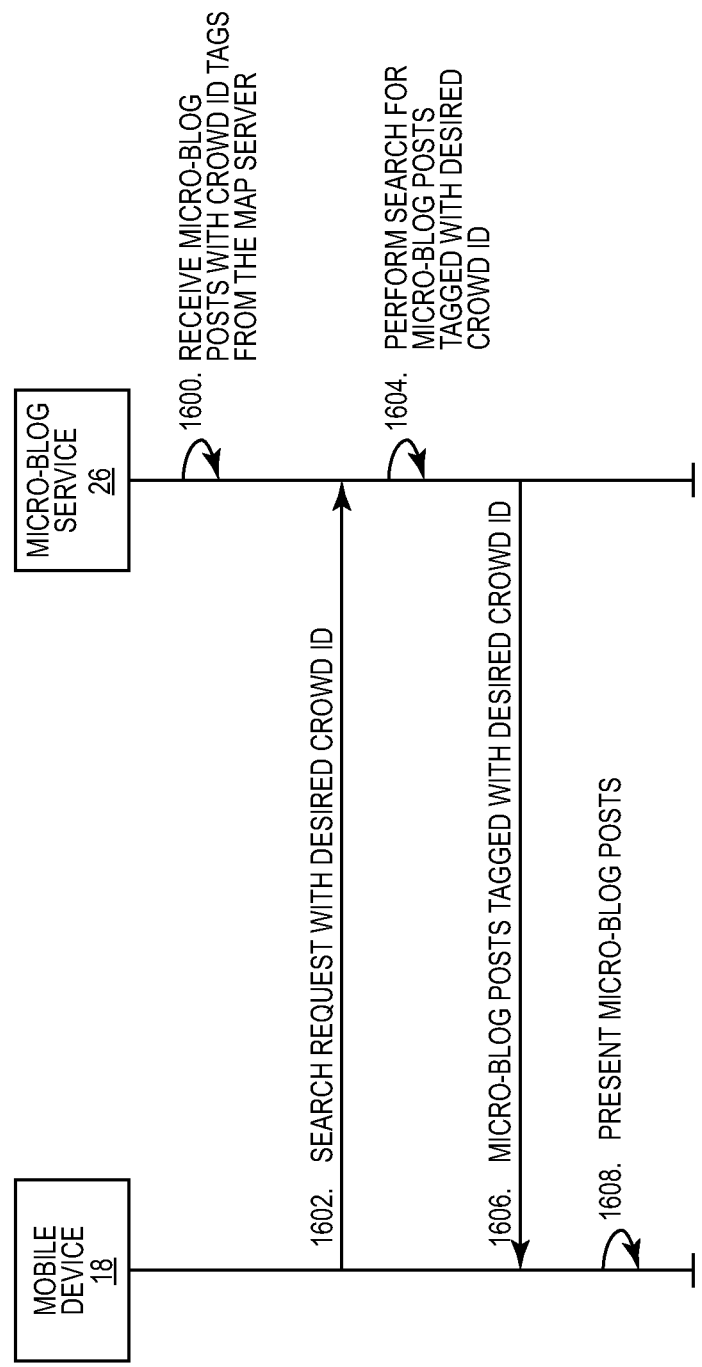
Figure 14:
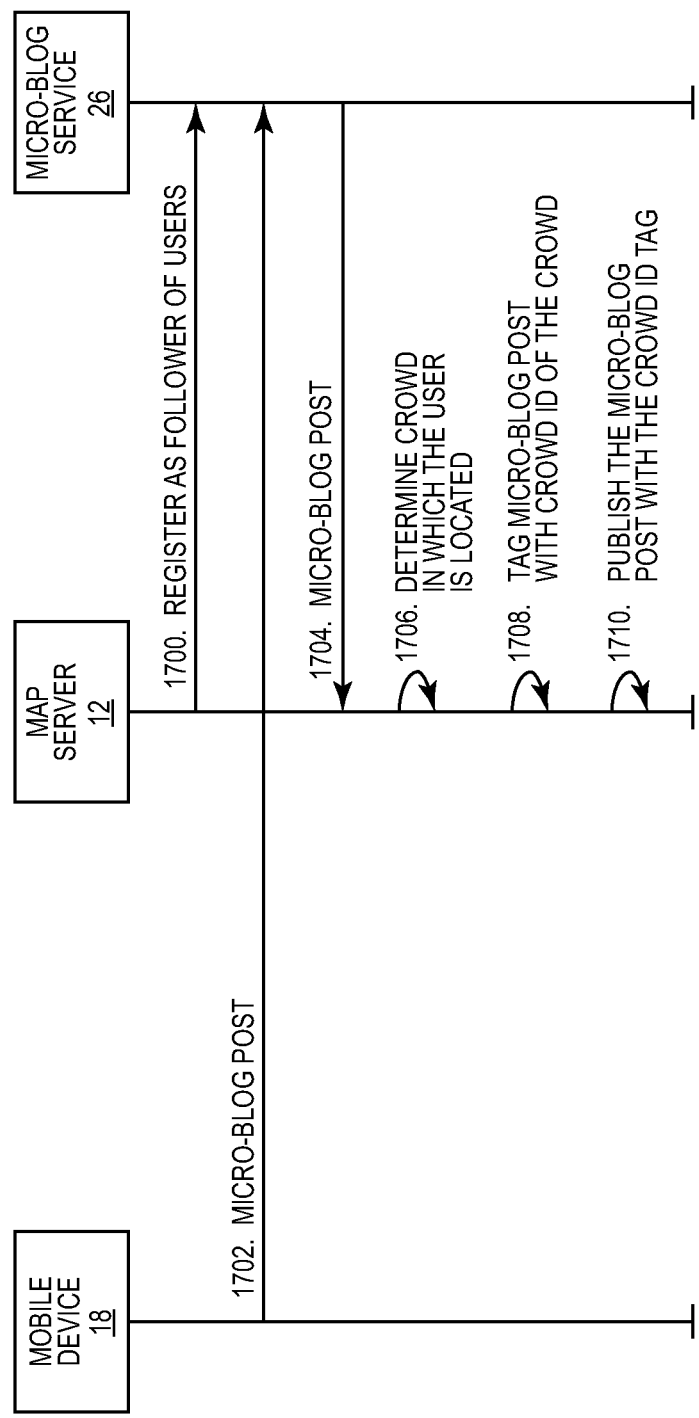
Figure 15:
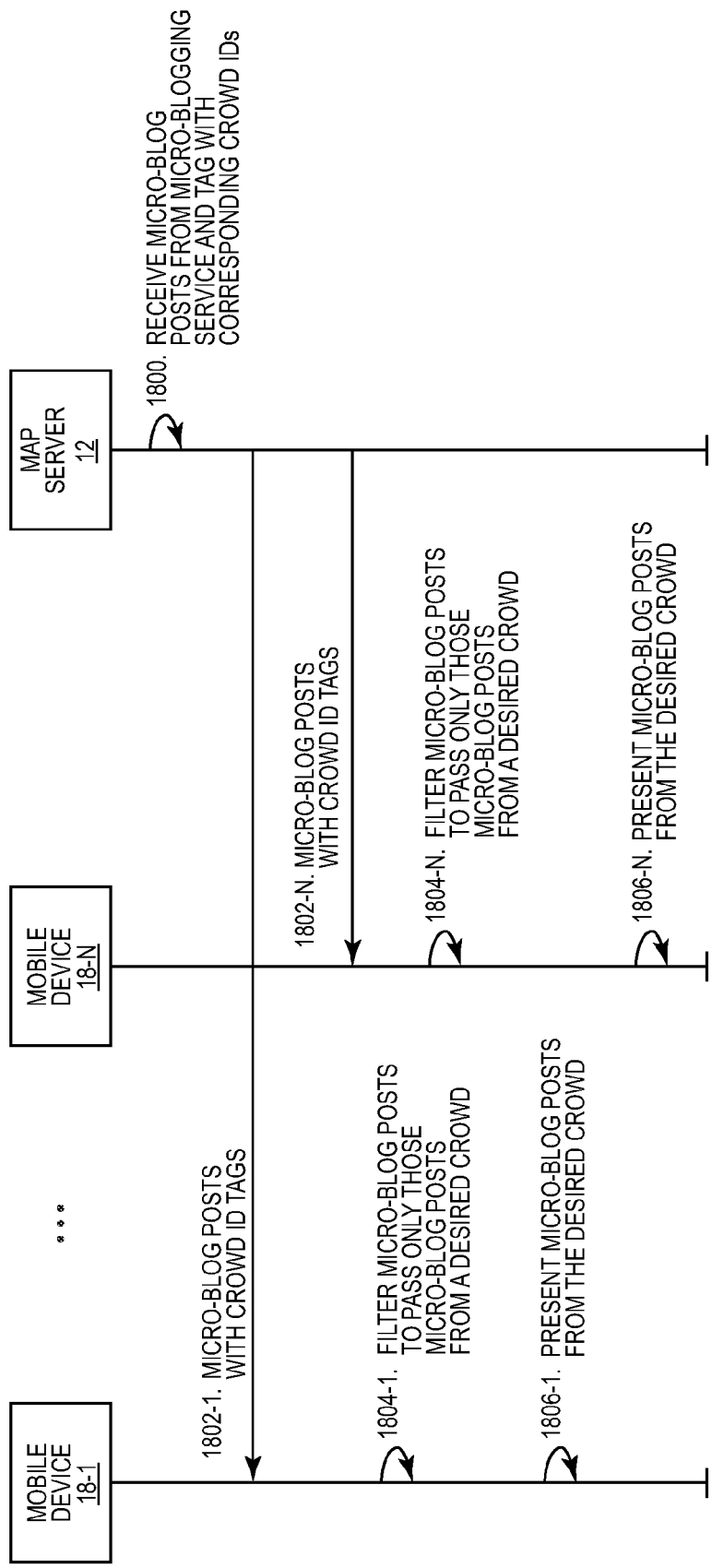
Figure 16:
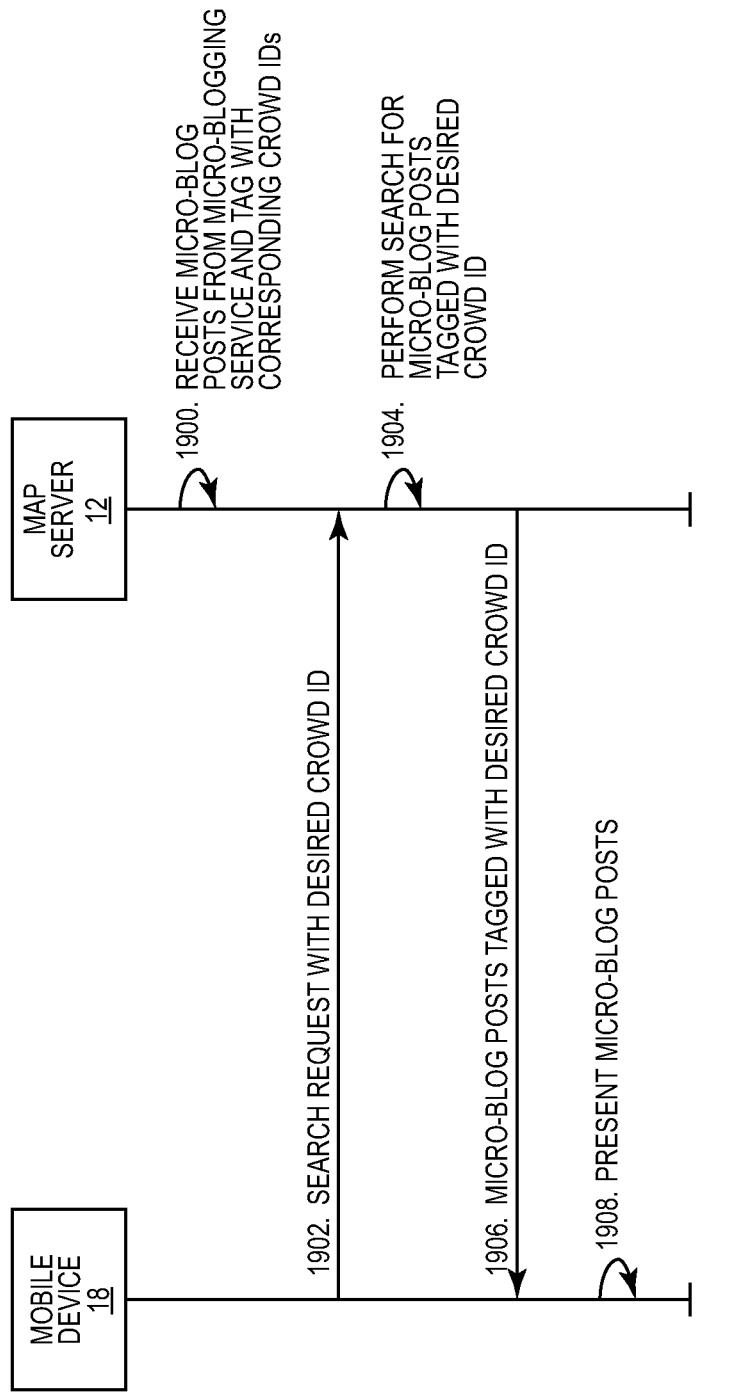
Figure 17:
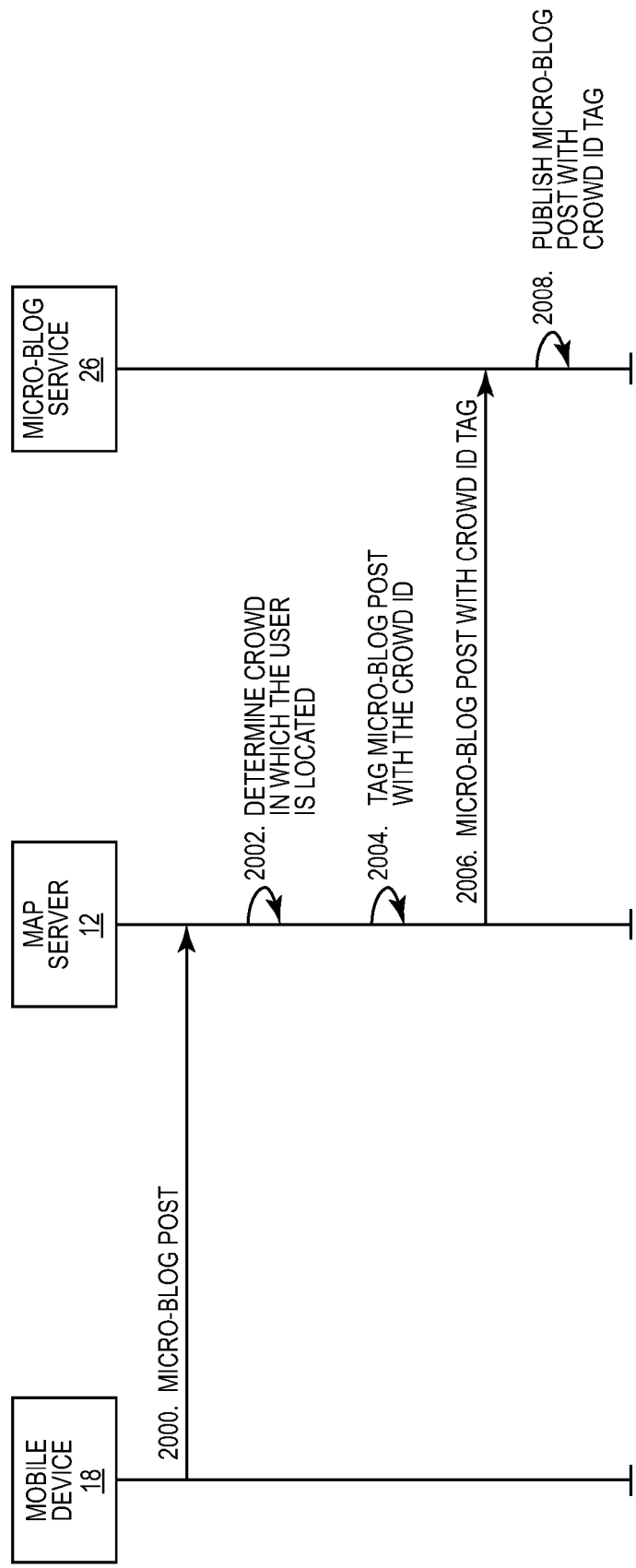
Figure 18:
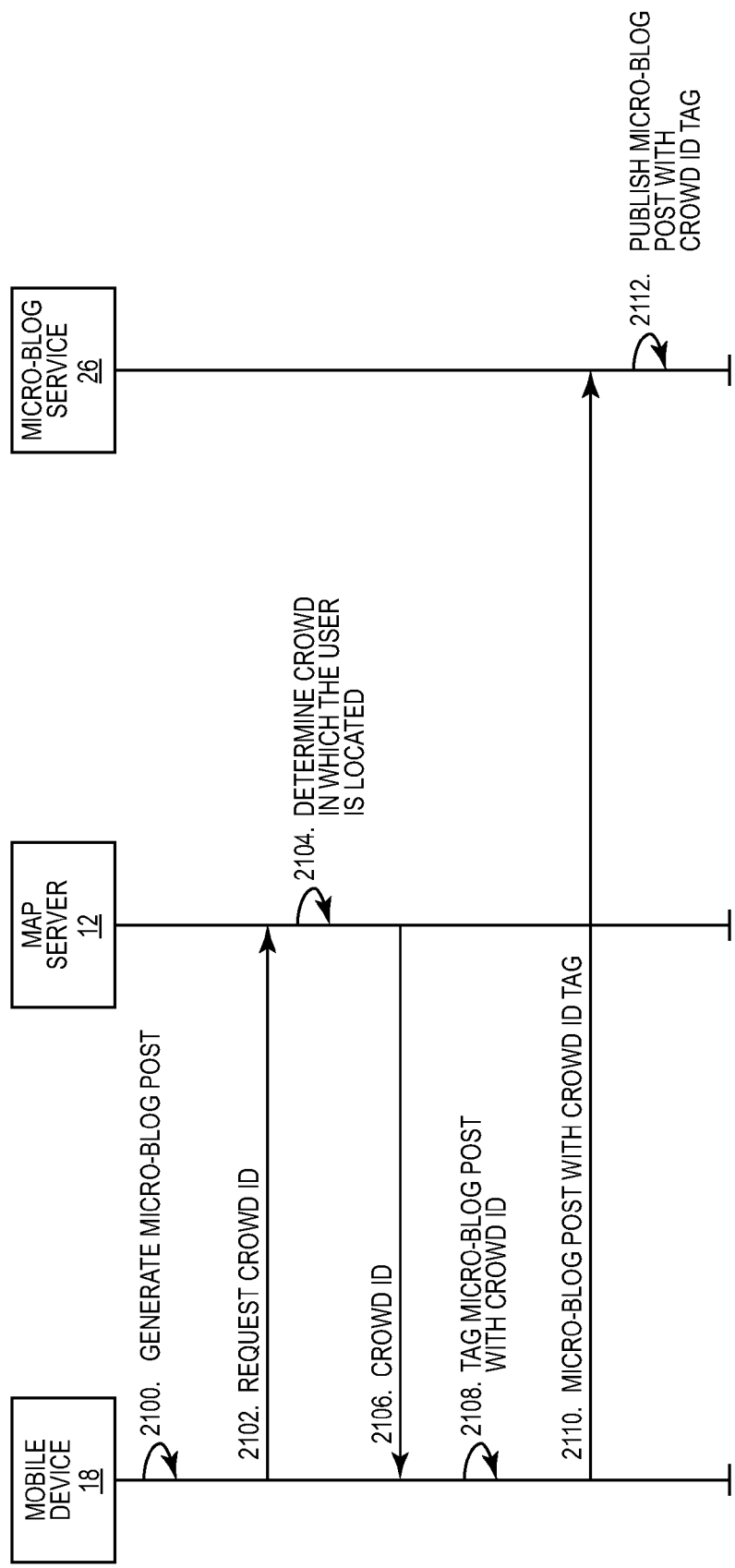
Figure 19:
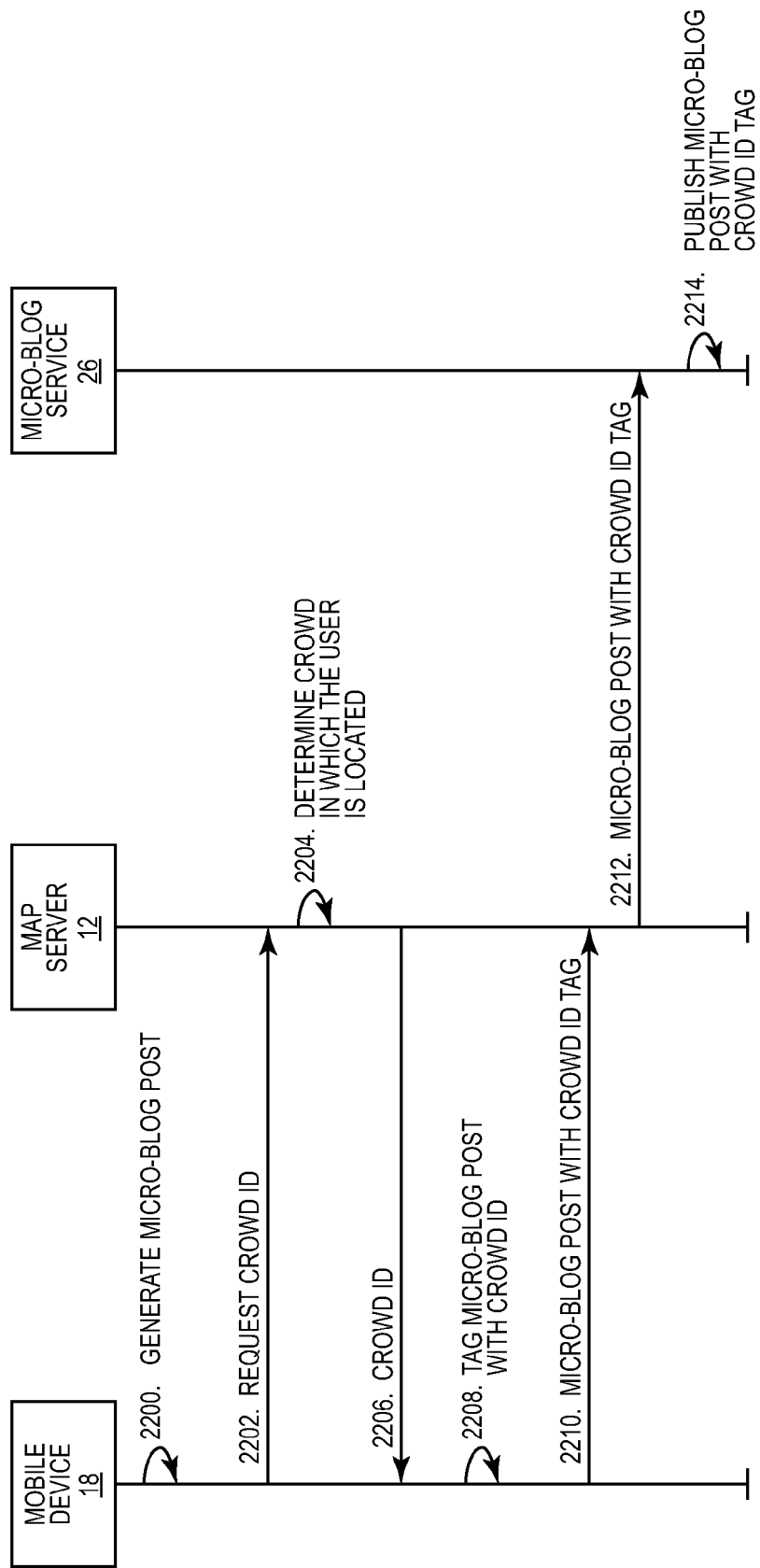
Figure 20:
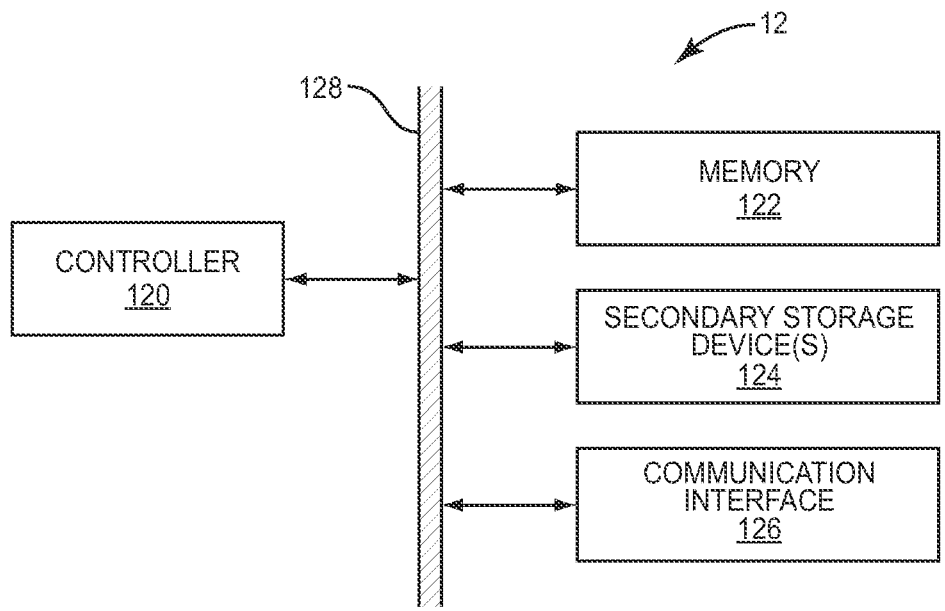
Figure 21:
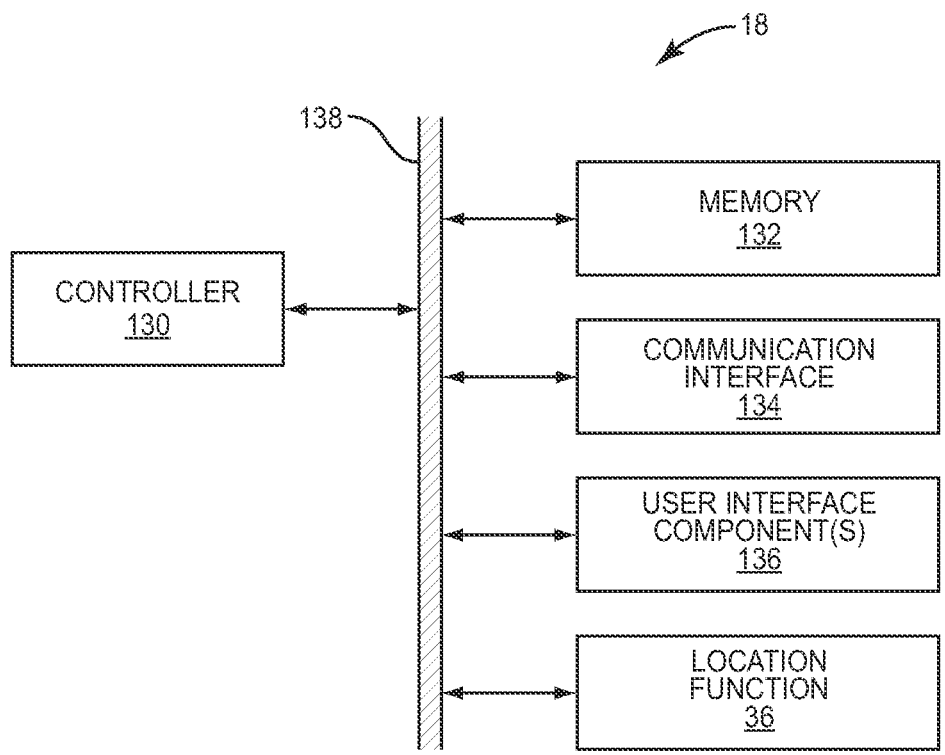
Figure 22:
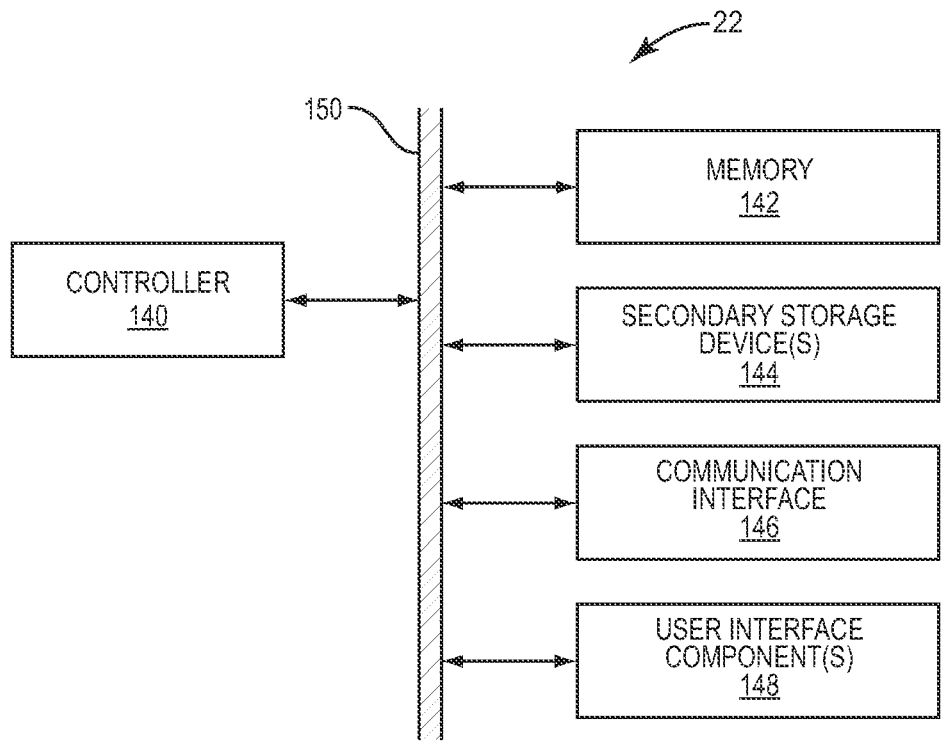
Figure 23:
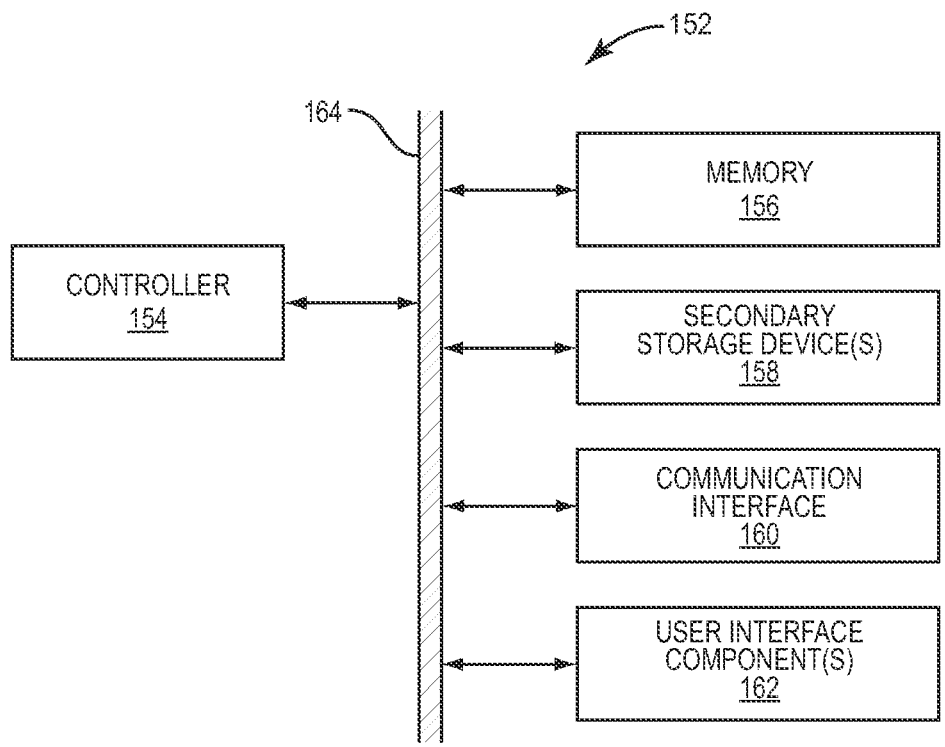

FIGS. 7A through 7D graphically illustrate the crowd formation process of FIGS. 6A through 6D for a scenario where the crowd formation process is triggered by a location update for a user having no old location;

FIGS. 8A through 8F graphically illustrate the crowd formation process of FIGS. 6A through 6D for a scenario where the new and old bounding boxes overlap;

FIGS. 9A through 9E graphically illustrate the crowd formation process of FIGS. 6A through 6D in a scenario where the new and old bounding boxes do not overlap;

FIG. 10 illustrates a process for tagging micro-blog posts of users with corresponding crowd identifier (ID) tags and effecting publication of the micro-blog posts including the crowd ID tags according to one embodiment of the present disclosure;

FIG. 11 illustrates the operation of the system of FIG. 1 to tag micro-blog posts of users with corresponding crowd ID tags and publish the micro-blog posts including the crowd ID tags according to one embodiment of the present disclosure;

FIG. 12 illustrates a process for publishing the micro-blog posts of FIG. 11 according to one embodiment of the present disclosure;

FIG. 13 illustrates a process for publishing the micro-blog posts of FIG. 11 according to another embodiment of the present disclosure;

FIG. 14 illustrates the operation of the system of FIG. 1 to tag micro-blog posts of users with corresponding crowd ID tags and publish the micro-blog posts including the crowd ID tags according to another embodiment of the present disclosure;

FIG. 15 illustrates a process for publishing the micro-blog post of FIG. 14 according to one embodiment of the present disclosure;

FIG. 16 illustrates a process for publishing the micro-blog post of FIG. 14 according to another embodiment of the present disclosure;

FIG. 17 illustrates the operation of the system of FIG. 1 to tag micro-blog posts of users with corresponding crowd ID tags and publish the micro-blog posts including the crowd ID tags according to another embodiment of the present disclosure;

FIG. 18 illustrates the operation of the system of FIG. 1 to tag micro-blog posts of users with corresponding crowd ID tags and publish the micro-blog posts including the crowd ID tags according to one embodiment of the present disclosure;

FIG. 19 illustrates the operation of the system of FIG. 1 to tag micro-blog posts of users with corresponding crowd ID tags and publish the micro-blog posts including the crowd ID tags according to one embodiment of the present disclosure;

FIG. 20 is a block diagram of the MAP server of FIG. 1 according to one embodiment of the present disclosure;

FIG. 21 is a block diagram of one of the mobile devices of FIG. 1 according to one embodiment of the present disclosure;

FIG. 22 is a block diagram of the subscriber device of FIG. 1 according to one embodiment of the present disclosure; and FIG. 23 is a block diagram of a server computer hosting the third-party service of FIG. 1 according to one embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

FIG. 1 illustrates a Mobile Aggregate Profile (MAP) system 10 (hereinafter "system 10") that enables ad-hoc micro-blogging groups according to one embodiment of the present disclosure. Note that the system 10 is exemplary and is not intended to limit the scope of the present disclosure. In this embodiment, the system 10 includes a MAP server 12, one or more profile servers 14, a location server 16, a number of mobile devices 18-1 through 18-N (generally referred to herein collectively as mobile devices 18 and individually as mobile device 18) having associated users 20-1 through 20-N (generally referred to herein collectively as users 20 and individually as user 20), a subscriber device 22 having an associated subscriber 24, and a micro-blogging service 26 communicatively coupled via a network 28. The network 28 may be any type of network or any combination of networks. Specifically, the network 28 may include wired components, wireless components, or both wired and wireless components. In one exemplary embodiment, the network 28 is a distributed public network such as the Internet, where the mobile devices 18 are enabled to connect to the network 28 via local wireless connections (e.g., WiFi® or IEEE 802.11 connections) or wireless telecommunications connections (e.g., 3G or 4G telecommunications connections such as GSM, LTE, W-CDMA, or WiMAX® connections).

As discussed below in detail, the MAP server 12 operates to obtain current locations, including location updates, and user profiles of the users 20 of the mobile devices 18. The current locations of the users 20 can be expressed as positional geographic coordinates such as latitude-longitude pairs, and a height vector (if applicable), or any other similar information capable of identifying a given physical point in space in a two-dimensional or three-dimensional coordinate system. Using the current locations and user profiles of the users 20, the MAP server 12 is enabled to provide a number of features such as, but not limited to, forming crowds of users using current locations and/or user profiles of the users 20, generating aggregate profiles for crowds of users, and tracking crowds. Note that while the MAP server 12 is illustrated as a single server for simplicity and ease of discussion, it should be appreciated that the MAP server 12 may be implemented as a single physical server or multiple physical servers operating in a collaborative manner for purposes of redundancy and/or load sharing.

In general, the one or more profile servers 14 operate to store user profiles for a number of persons including the users 20 of the mobile devices 18. For example, the one or more profile servers 14 may be servers providing social network services such as the Facebook® social networking service, the MySpace® social networking service, the LinkedIN® social networking service, or the like. As discussed below, using the one or more profile servers 14, the MAP server 12 is enabled to directly or indirectly obtain the user profiles of the users 20 of the mobile devices 18. The location server 16 generally operates to receive location updates from the mobile devices 18 and make the location updates available to entities such as, for instance, the MAP server 12. In one exemplary embodiment, the location server 16 is a server operating to provide Yahoo!'s Fire Eagle® service.

The mobile devices 18 may be mobile smart phones, portable media player devices, mobile gaming devices, or the like. Some exemplary mobile devices that may be programmed or otherwise configured to operate as the mobile devices 18 are the Apple® iPhone®, the Palm Pre®, the Samsung Rogue™, the Blackberry Storm™, the Motorola Droid or similar phone running Google's Android™ Operating System, an Apple® iPad®, and the Apple® iPod Touch® device. However, this list of exemplary mobile devices is not exhaustive and is not intended to limit the scope of the present disclosure.

The mobile devices 18-1 through 18-N include MAP clients 30-1 through 30-N (generally referred to herein collectively as MAP clients 30 or individually as MAP client 30), MAP applications 32-1 through 32-N (generally referred to herein collectively as MAP applications 32 or individually as MAP application 32), third-party applications 34-1 through 34-N (generally referred to herein collectively as third-party applications 34 or individually as third-party application 34), and location functions 36-1 through 36-N (generally referred to herein collectively as location functions 36 or individually as location function 36), respectively. The MAP client 30 is preferably implemented in software. In general, in the preferred embodiment, the MAP client 30 is a middleware layer operating to interface an application layer (i.e., the MAP application 32 and the third-party applications 34) to the MAP server 12. More specifically, the MAP client 30 enables the MAP application 32 and the third-party applications 34 to request and receive data from the MAP server 12. In addition, the MAP client 30 enables applications, such as the MAP application 32 and the third-party applications 34, to access data from the MAP server 12.

The MAP application 32 is also preferably implemented in software. The MAP application 32 generally provides a user interface component between the user 20 and the MAP server 12. More specifically, among other things, the MAP application 32 enables the user 20 to initiate requests for crowd data from the MAP server 12 and present corresponding crowd data returned by the MAP server 12 to the user 20 as well as enable the user 20 to follow micro-blog posts sent by users in desired crowds. The MAP application 32 also enables the user 20 to configure various settings. For example, the MAP application 32 may enable the user 20 to select a desired social networking service (e.g., Facebook®, MySpace®, LinkedIN®, etc.) from which to obtain the user profile of the user 20 and provide any necessary credentials (e.g., username and password) needed to access the user profile from the social networking service.

The third-party applications 34 are preferably implemented in software. The third-party applications 34 operate to access the MAP server 12 via the MAP client 30. The third-party applications 34 may utilize data obtained from the MAP server 12 in any desired manner. As an example, one of the third-party applications 34 may be a gaming application that utilizes crowd data to notify the user 20 of Points of Interest (POIs) or Areas of Interest (AOIs) where crowds of interest are currently located. It should be noted that while the MAP client 30 is illustrated as being separate from the MAP application 32 and the third-party applications 34, the present disclosure is not limited thereto. The functionality of the MAP client 30 may alternatively be incorporated into the MAP application 32 and the third-party applications 34.

The location function 36 may be implemented in hardware, software, or a combination thereof. In general, the location function 36 operates to determine or otherwise obtain the location of the mobile device 18. For example, the location function 36 may be or include a Global Positioning System (GPS) receiver. In addition or alternatively, the location function 36 may include hardware and/or software that enables improved location tracking in indoor environments such as, for example, shopping malls. For example, the location function 36 may be part of or compatible with the InvisiTrack Location System provided by InvisiTrack and described in U.S. Pat. No. 7,423,580 entitled "Method and System of Three-Dimensional Positional Finding" which issued on Sep. 9, 2008, U.S. Pat. No. 7,787,886 entitled "System and Method for Locating a Target using RFID" which issued on Aug. 31, 2010, and U.S. Patent Application Publication No. 2007/0075898 entitled "Method and System for Positional Finding Using RF, Continuous and/or Combined Movement" which published on Apr. 5, 2007, all of which are hereby incorporated herein by reference for their teachings regarding location tracking.

The subscriber device 22 is a physical device such as a personal computer, a mobile computer (e.g., a notebook computer, a netbook computer, a tablet computer, etc.), a mobile smart phone, or the like. The subscriber 24 associated with the subscriber device 22 is a person or entity. In general, the subscriber device 22 enables the subscriber 24 to access the MAP server 12 via a web browser 38 to obtain various types of data, preferably for a fee. For example, the subscriber 24 may pay a fee to have access to crowd data such as aggregate profiles for crowds located at one or more POIs and/or located in one or more AOIs, pay a fee to track crowds, or the like. Note that the web browser 38 is exemplary. In another embodiment, the subscriber device 22 is enabled to access the MAP server 12 via a custom application.

Lastly, the micro-blogging service 26 is a service that enables the users 20 to send and receive micro-blog posts. As used herein, a micro-blog post is a message posted by a user for publication via a micro-blogging service. A micro-blog post may include text, audio, video, an image, or any combination thereof. As an example, a micro-blog post may be a tweet posted by a user of the Twitter® micro-blogging and social networking service or a post made by a user of the Facebook® social networking service. As discussed below in detail, requestors (e.g., the users 20 or the subscriber 24) are enabled to obtain micro-blog posts from the users 20 in desired crowds of users.

Before proceeding, it should be noted that while the system 10 of FIG. 1 illustrates an embodiment where the one or more profile servers 14, the location server 16, and the micro-blogging service 26 are separate from the MAP server 12, the present disclosure is not limited thereto. In an alternative embodiment, the functionality of the one or more profile servers 14, the location server 16, and/or the micro-blogging service 26 may be implemented within the MAP server 12. Further, while the profile servers 14, the location server 16, and the micro-blogging service 26 are separate in the embodiment of FIG. 1, in another embodiment, the functionality of the profile servers 14, the location server 16, and/or the micro-blogging service 26 may be implemented in a single service.

Figure 2:
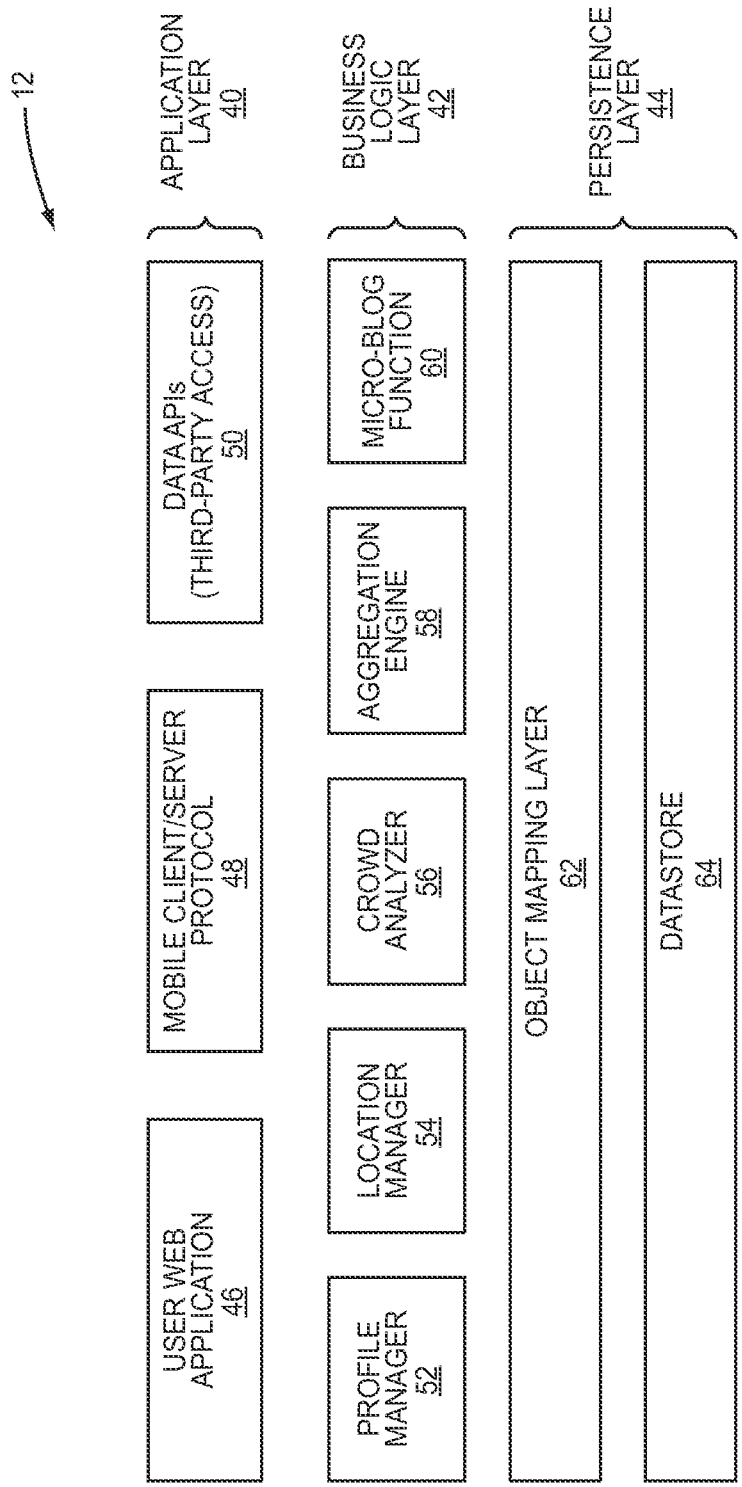
FIG. 2 is a block diagram of the MAP server of FIG. 1 according to one embodiment of the present disclosure.

FIG. 2 is a block diagram of the MAP server 12 of FIG. 1 according to one embodiment of the present disclosure. As illustrated, the MAP server 12 includes an application layer 40, a business logic layer 42, and a persistence layer 44. The application layer 40 includes a user web application 46, a mobile client/server protocol component 48, and one or more data Application Programming Interfaces (APIs) 50. The user web application 46 is preferably implemented in software and operates to provide a web interface for users, such as the subscriber 24, to access the MAP server 12 via a web browser. The mobile client/server protocol component 48 is preferably implemented in software and operates to provide an interface between the MAP server 12 and the MAP clients 30 hosted by the mobile devices 18. The data APIs 50 enable third-party services, such as the micro-blogging service 26, to access the MAP server 12.

The business logic layer 42 includes a profile manager 52, a location manager 54, a crowd analyzer 56, an aggregation engine 58, and a micro-blog function 60 each of which is preferably implemented in software. The profile manager 52 generally operates to obtain the user profiles of the users 20 directly or indirectly from the one or more profile servers 14 and store the user profiles in the persistence layer 44. The location manager 54 operates to obtain the current locations of the users 20 including location updates. As discussed below, the current locations of the users 20 may be obtained directly from the mobile devices 18 and/or obtained from the location server 16.

The crowd analyzer 56 operates to form crowds of users. In one embodiment, the crowd analyzer 56 utilizes a spatial crowd formation algorithm. However, the present disclosure is not limited thereto. In addition, the crowd analyzer 56 may further characterize crowds to reflect degree of fragmentation, best-case and worst-case degree of separation (DOS), and/or degree of bi-directionality. Still further, the crowd analyzer 56 may also operate to track crowds. The aggregation engine 58 generally operates to provide aggregate profile data. The aggregate profile data may be aggregate profile data for crowd(s) of users. As discussed below in detail, the micro-blog function 60 enables requestors, such as but not limited to the users 20 and the subscriber 24, to obtain micro-blog posts from users in desired crowds of users by tagging micro-blog posts made by the users 20 with crowd identifiers (IDs) of the crowds in which the corresponding users 20 are located. For additional information regarding the operation of the profile manager 52, the location manager 54, the crowd analyzer 56, and the aggregation engine 58, the interested reader is directed to U.S. Patent Application Publication No. 2010/0198828, entitled FORMING CROWDS AND PROVIDING ACCESS TO CROWD DATA IN A MOBILE ENVIRONMENT, which published on Aug. 5, 2010; U.S. Patent Application Publication No. 2010/0197318, entitled ANONYMOUS CROWD TRACKING, which published on Aug. 5, 2010; U.S. Patent Application Publication No. 2010/0198826, entitled MAINTAINING A HISTORICAL RECORD OF ANONYMIZED USER PROFILE DATA BY LOCATION FOR USERS IN A MOBILE ENVIRONMENT, which published on Aug. 5, 2010; U.S. Patent Application Publication No. 2010/0198917, entitled CROWD FORMATION FOR MOBILE DEVICE USERS, which published on Aug. 5, 2010; U.S. Patent Application Publication No. 2010/0198870, entitled SERVING A REQUEST FOR DATA FROM A HISTORICAL RECORD OF ANONYMIZED USER PROFILE DATA IN A MOBILE ENVIRONMENT, which published on Aug. 5, 2010; U.S. Patent Application Publication No. 2010/0198862, entitled HANDLING CROWD REQUESTS FOR LARGE GEOGRAPHIC AREAS, which published on Aug. 5, 2010; and U.S. Patent Application Publication No. 2010/0197319, entitled MODIFYING A USER'S CONTRIBUTION TO AN AGGREGATE PROFILE BASED ON TIME BETWEEN LOCATION UPDATES AND EXTERNAL EVENTS, which published on Aug. 5, 2010; all of which are hereby incorporated herein by reference in their entireties.

The persistence layer 44 includes an object mapping layer 62 and a datastore 64. The object mapping layer 62 is preferably implemented in software. The datastore 64 is preferably a relational database, which is implemented in a combination of hardware (i.e., physical data storage hardware) and software (i.e., relational database software). In this embodiment, the business logic layer 42 is implemented in an object-oriented programming language such as, for example, Java. As such, the object mapping layer 62 operates to map objects used in the business logic layer 42 to relational database entities stored in the datastore 64. Note that, in one embodiment, data is stored in the datastore 64 in a Resource Description Framework (RDF) compatible format.

In an alternative embodiment, rather than being a relational database, the datastore 64 may be implemented as an RDF datastore. More specifically, the RDF datastore may be compatible with RDF technology adopted by Semantic Web activities. Namely, the RDF datastore may use the Friend-Of-A-Friend (FOAF) vocabulary for describing people, their social networks, and their interests. In this embodiment, the MAP server 12 may be designed to accept raw FOAF files describing persons, their friends, and their interests. These FOAF files are currently output by some social networking services such as LiveJournal® and Facebook®. The MAP server 12 may then persist RDF descriptions of the users 20 as a proprietary extension of the FOAF vocabulary that includes additional properties desired for the system 10.

Figure 3:
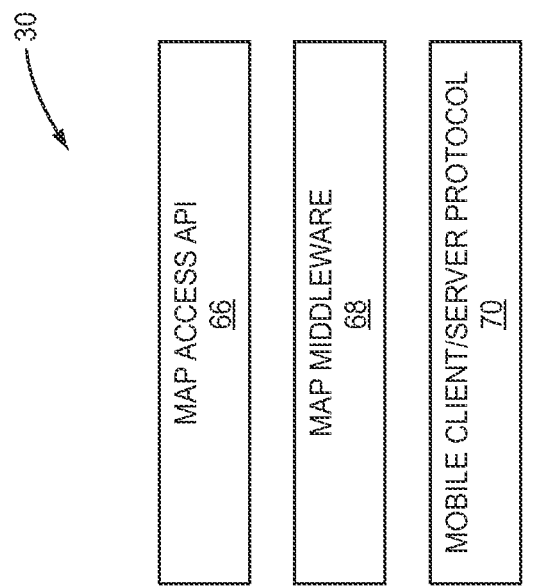
FIG. 3 is a block diagram of the MAP client of one of the mobile devices of FIG. 1 according to one embodiment of the present disclosure.

FIG. 3 illustrates the MAP client 30 of FIG. 1 in more detail according to one embodiment of the present disclosure. As illustrated, in this embodiment, the MAP client 30 includes a MAP access API 66, a MAP middleware component 68, and a mobile client/server protocol component 70. The MAP access API 66 is implemented in software and provides an interface by which the MAP application 32 and the third-party applications 34 are enabled to access the MAP client 30. The MAP middleware component 68 is implemented in software and performs the operations needed for the MAP client 30 to operate as an interface between the MAP application 32 and the third-party applications 34 at the mobile device 18 and the MAP server 12. The mobile client/server protocol component 70 enables communication between the MAP client 30 and the MAP server 12 via a defined protocol.

Figure 4:
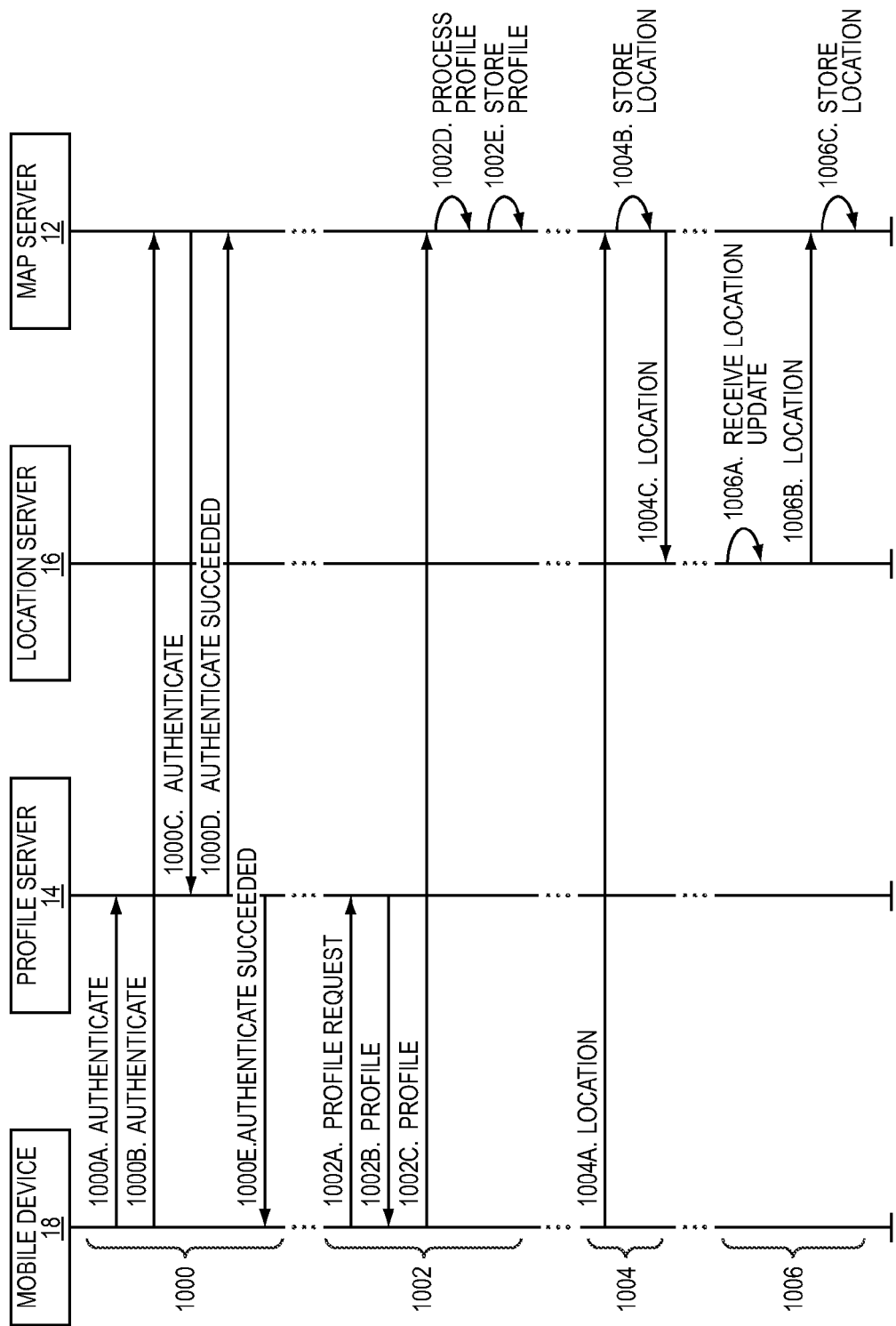
FIG. 4 illustrates the operation of the system of FIG. 1 to provide user profiles and current locations of the users of the mobile devices to the MAP server according to one embodiment of the present disclosure.

FIG. 4 illustrates the operation of the system 10 of FIG. 1 to provide the user profile of one of the users 20 of one of the mobile devices 18 to the MAP server 12 according to one embodiment of the present disclosure. This discussion is equally applicable to the other users 20 of the other mobile devices 18. First, an authentication process is performed (step 1000). For authentication, in this embodiment, the mobile device 18 authenticates with the profile server 14 (step 1000A) and the MAP server 12 (step 1000B). In addition, the MAP server 12 authenticates with the profile server 14 (step 1000C). Preferably, authentication is performed using OpenID or similar technology. However, authentication may alternatively be performed using separate credentials (e.g., username and password) of the user 20 for access to the MAP server 12 and the profile server 14. Assuming that authentication is successful, the profile server 14 returns an authentication succeeded message to the MAP server 12 (step 1000D), and the profile server 14 returns an authentication succeeded message to the MAP client 30 of the mobile device 18 (step 1000E).

At some point after authentication is complete, a user profile process is performed such that a user profile of the user 20 is obtained from the profile server 14 and delivered to the MAP server 12 (step 1002). In this embodiment, the MAP client 30 of the mobile device 18 sends a profile request to the profile server 14 (step 1002A). In response, the profile server 14 returns the user profile of the user 20 to the mobile device 18 (step 1002B). The MAP client 30 of the mobile device 18 then sends the user profile of the user 20 to the MAP server 12 (step 1002C). Note that while in this embodiment the MAP client 30 sends the complete user profile of the user 20 to the MAP server 12, in an alternative embodiment, the MAP client 30 may filter the user profile of the user 20 according to criteria specified by the user 20. For example, the user profile of the user 20 may include demographic information, general interests, music interests, and movie interests, and the user 20 may specify that the demographic information or some subset thereof is to be filtered, or removed, before sending the user profile to the MAP server 12.

Upon receiving the user profile of the user 20 from the MAP client 30 of the mobile device 18, the profile manager 52 of the MAP server 12 processes the user profile (step 1002D). More specifically, in the preferred embodiment, the profile manager 52 includes social network handlers for the social network services supported by the MAP server 12 that operate to map the user profiles of the users 20 obtained from the social network services to a common format utilized by the MAP server 12. This common format includes a number of user profile categories, or user profile slices, such as, for example, a demographic profile category, a social interaction profile category, a general interests category, a music interests profile category, and a movie interests profile category. For example, if the MAP server 12 supports user profiles from Facebook®, MySpace®, and LinkedIN®, the profile manager 52 may include a Facebook handler, a MySpace handler, and a LinkedIN handler. The social network handlers process user profiles from the corresponding social network services to generate user profiles for the users 20 in the common format used by the MAP server 12. For this example assume that the user profile of the user 20 is from Facebook®. The profile manager 52 uses a Facebook handler to process the user profile of the user 20 to map the user profile of the user 20 from Facebook® to a user profile for the user 20 for the MAP server 12 that includes lists of keywords for a number of predefined profile categories, or profile slices, such as, for example, a demographic profile category, a social interaction profile category, a general interests profile category, a music interests profile category, and a movie interests profile category. As such, the user profile of the user 20 from Facebook® may be processed by the Facebook handler of the profile manager 52 to create a list of keywords such as, for example, liberal, High School Graduate, 35-44, College Graduate, etc. for the demographic profile category; a list of keywords such as Seeking Friendship for the social interaction profile category; a list of keywords such as politics, technology, photography, books, etc. for the general interests profile category; a list of keywords including music genres, artist names, album names, or the like for the music interests profile category; and a list of keywords including movie titles, actor or actress names, director names, movie genres, or the like for the movie interests profile category. In one embodiment, the profile manager 52 may use natural language processing or semantic analysis. For example, if the Facebook® user profile of the user 20 states that the user 20 is 20 years old, semantic analysis may result in the keyword of 18-24 years old being stored in the user profile of the user 20 for the MAP server 12.

After processing the user profile of the user 20, the profile manager 52 of the MAP server 12 stores the resulting user profile for the user 20 (step 1002E). More specifically, in one embodiment, the MAP server 12 stores user records for the users 20 in the datastore 64 (FIG. 2). The user profile of the user 20 is stored in the user record of the user 20. The user record of the user 20 includes a unique identifier of the user 20, the user profile of the user 20, and, as discussed below, a current location of the user 20. Note that the user profile of the user 20 may be updated as desired. For example, in one embodiment, the user profile of the user 20 is updated by repeating step 1002 each time the user 20 activates the MAP application 32.

Note that while the discussion herein focuses on an embodiment where the user profiles of the users 20 are obtained from the one or more profile servers 14, the user profiles of the users 20 may be obtained in any desired manner. For example, in one alternative embodiment, the user 20 may identify one or more favorite websites. The profile manager 52 of the MAP server 12 may then crawl the one or more favorite websites of the user 20 to obtain keywords appearing in the one or more favorite websites of the user 20. These keywords may then be stored as the user profile of the user 20.

At some point, a process is performed such that a current location of the mobile device 18 and thus a current location of the user 20 is obtained by the MAP server 12 (step 1004). In this embodiment, the MAP application 32 of the mobile device 18 obtains the current location of the mobile device 18 from the location function 36 of the mobile device 18. The MAP application 32 then provides the current location of the mobile device 18 to the MAP client 30, and the MAP client 30 then provides the current location of the mobile device 18 to the MAP server 12 (step 1004A). Note that step 1004A may be repeated periodically or in response to a change in the current location of the mobile device 18 in order for the MAP application 32 to provide location updates for the user 20 to the MAP server 12.

In response to receiving the current location of the mobile device 18, the location manager 54 of the MAP server 12 stores the current location of the mobile device 18 as the current location of the user 20 (step 1004B). More specifically, in one embodiment, the current location of the user 20 is stored in the user record of the user 20 maintained in the datastore 64 of the MAP server 12. Note that, in the preferred embodiment, only the current location of the user 20 is stored in the user record of the user 20. In this manner, the MAP server 12 maintains privacy for the user 20 since the MAP server 12 does not maintain a historical record of the location of the user 20. Any historical data maintained by the MAP server 12 is preferably anonymized in order to maintain the privacy of the users 20.

In addition to storing the current location of the user 20, the location manager 54 sends the current location of the user 20 to the location server 16 (step 1004C). In this embodiment, by providing location updates to the location server 16, the MAP server 12 in return receives location updates for the user 20 from the location server 16. This is particularly beneficial when the mobile device 18 does not permit background processes. If the mobile device 18 does not permit background processes, the MAP application 32 will not be able to provide location updates for the user 20 to the MAP server 12 unless the MAP application 32 is active. Therefore, when the MAP application 32 is not active, other applications running on the mobile device 18 (or some other device of the user 20) may directly or indirectly provide location updates to the location server 16 for the user 20. This is illustrated in step 1006 where the location server 16 receives a location update for the user 20 directly or indirectly from another application running on the mobile device 18 or an application running on another device of the user 20 (step 1006A). The location server 16 then provides the location update for the user 20 to the MAP server 12 (step 1006B). In response, the location manager 54 updates and stores the current location of the user 20 in the user record of the user 20 (step 1006C). In this manner, the MAP server 12 is enabled to obtain location updates for the user 20 even when the MAP application 32 is not active at the mobile device 18.

Figure 5:
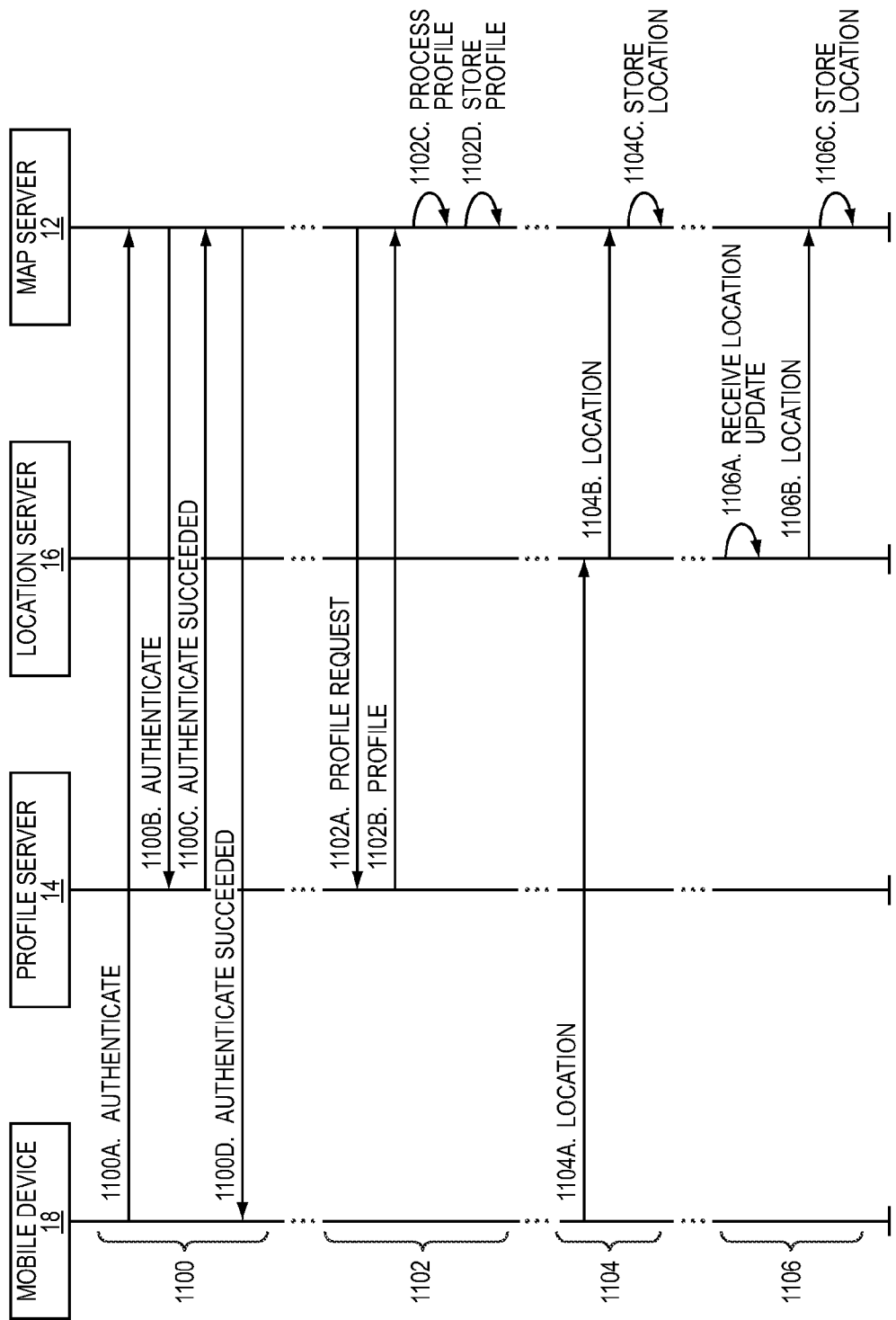
FIG. 5 illustrates the operation of the system of FIG. 1 to provide user profiles and current locations of the users of the mobile devices to the MAP server according to another embodiment of the present disclosure.

FIG. 5 illustrates the operation of the system 10 of FIG. 1 to provide the user profile of the user 20 of one of the mobile devices 18 to the MAP server 12 according to another embodiment of the present disclosure. This discussion is equally applicable to user profiles of the users 20 of the other mobile devices 18. First, an authentication process is performed (step 1100). For authentication, in this embodiment, the mobile device 18 authenticates with the MAP server 12 (step 1100A), and the MAP server 12 authenticates with the profile server 14 (step 1100B). Preferably, authentication is performed using OpenID or similar technology. However, authentication may alternatively be performed using separate credentials (e.g., username and password) of the user 20 for access to the MAP server 12 and the profile server 14. Assuming that authentication is successful, the profile server 14 returns an authentication succeeded message to the MAP server 12 (step 1100C), and the MAP server 12 returns an authentication succeeded message to the MAP client 30 of the mobile device 18 (step 1100D).

At some point after authentication is complete, a user profile process is performed such that a user profile of the user 20 is obtained from the profile server 14 and delivered to the MAP server 12 (step 1102). In this embodiment, the profile manager 52 of the MAP server 12 sends a profile request to the profile server 14 (step 1102A). In response, the profile server 14 returns the user profile of the user 20 to the profile manager 52 of the MAP server 12 (step 1102B). Note that while in this embodiment the profile server 14 returns the complete user profile of the user 20 to the MAP server 12, in an alternative embodiment, the profile server 14 may return a filtered version of the user profile of the user 20 to the MAP server 12. The profile server 14 may filter the user profile of the user 20 according to criteria specified by the user 20. For example, the user profile of the user 20 may include demographic information, general interests, music interests, and movie interests, and the user 20 may specify that the demographic information or some subset thereof is to be filtered, or removed, before sending the user profile to the MAP server 12.

Upon receiving the user profile of the user 20, the profile manager 52 of the MAP server 12 processes the user profile (step 1102C). More specifically, as discussed above, in the preferred embodiment, the profile manager 52 includes social network handlers for the social network services supported by the MAP server 12. The social network handlers process user profiles to generate user profiles for the MAP server 12 that include lists of keywords for each of a number of profile categories, or profile slices.

After processing the user profile of the user 20, the profile manager 52 of the MAP server 12 stores the resulting user profile for the user 20 (step 1102D). More specifically, in one embodiment, the MAP server 12 stores user records for the users 20 in the datastore 64 (FIG. 2). The user profile of the user 20 is stored in the user record of the user 20. The user record of the user 20 includes a unique identifier of the user 20, the user profile of the user 20, and, as discussed below, a current location of the user 20. Note that the user profile of the user 20 may be updated as desired. For example, in one embodiment, the user profile of the user 20 is updated by repeating step 1102 each time the user 20 activates the MAP application 32.

Note that while the discussion herein focuses on an embodiment where the user profiles of the users 20 are obtained from the one or more profile servers 14, the user profiles of the users 20 may be obtained in any desired manner. For example, in one alternative embodiment, the user 20 may identify one or more favorite websites. The profile manager 52 of the MAP server 12 may then crawl the one or more favorite websites of the user 20 to obtain keywords appearing in the one or more favorite websites of the user 20. These keywords may then be stored as the user profile of the user 20.

At some point, a process is performed such that a current location of the mobile device 18 and thus a current location of the user 20 is obtained by the MAP server 12 (step 1104). In this embodiment, the MAP application 32 of the mobile device 18 obtains the current location of the mobile device 18 from the location function 36 of the mobile device 18. The MAP application 32 then provides the current location of the user 20 of the mobile device 18 to the location server 16 (step 1104A). Note that step 1104A may be repeated periodically or in response to changes in the location of the mobile device 18 in order to provide location updates for the user 20 to the MAP server 12. The location server 16 then provides the current location of the user 20 to the MAP server 12 (step 1104B). The location server 16 may provide the current location of the user 20 to the MAP server 12 automatically in response to receiving the current location of the user 20 from the mobile device 18 or in response to a request from the MAP server 12.

In response to receiving the current location of the mobile device 18, the location manager 54 of the MAP server 12 stores the current location of the mobile device 18 as the current location of the user 20 (step 1104C). More specifically, in one embodiment, the current location of the user 20 is stored in the user record of the user 20 maintained in the datastore 64 of the MAP server 12. Note that, in the preferred embodiment, only the current location of the user 20 is stored in the user record of the user 20. In this manner, the MAP server 12 maintains privacy for the user 20 since the MAP server 12 does not maintain a historical record of the location of the user 20. As discussed below in detail, historical data maintained by the MAP server 12 is preferably anonymized in order to maintain the privacy of the users 20.

As discussed above, the use of the location server 16 is particularly beneficial when the mobile device 18 does not permit background processes. As such, if the mobile device 18 does not permit background processes, the MAP application 32 will not provide location updates for the user 20 to the location server 16 unless the MAP application 32 is active. However, other applications running on the mobile device 18 (or some other device of the user 20) may provide location updates to the location server 16 for the user 20 when the MAP application 32 is not active. This is illustrated in step 1106 where the location server 16 receives a location update for the user 20 from another application running on the mobile device 18 or an application running on another device of the user 20 (step 1106A). The location server 16 then provides the location update for the user 20 to the MAP server 12 (step 1106B). In response, the location manager 54 updates and stores the current location of the user 20 in the user record of the user 20 (step 1106C). In this manner, the MAP server 12 is enabled to obtain location updates for the user 20 even when the MAP application 32 is not active at the mobile device 18.

FIGS. 6A through 6D begin a discussion of the operation of the crowd analyzer 56 to form crowds of users according to one embodiment of the present disclosure. FIGS. 6A through 6D illustrate a flow chart for a spatial crowd formation process according to one embodiment of the present disclosure. In this embodiment, the spatial crowd formation process is triggered in response to receiving a location update for one of the users 20 and is preferably repeated for each location update received for the users 20. As such, first, the crowd analyzer 56 receives a location update, or a new location, for one of the users 20 (step 1200). In response, the crowd analyzer 56 retrieves an old location of the user 20, if any (step 1202). The old location is the current location of the user 20 prior to receiving the new location. The crowd analyzer 56 then creates a new bounding box of a predetermined size centered at the new location of the user 20 (step 1204) and an old bounding box of a predetermined size centered at the old location of the user 20, if any (step 1206). The predetermined size of the new and old bounding boxes may be any desired size. As one example, the predetermined size of the new and old bounding boxes is 40 meters by 40 meters. Note that if the user 20 does not have an old location (i.e., the location received in step 1200 is the first location received for the user 20), then the old bounding box is essentially null. Also note that while bounding "boxes" are used in this example, the bounding areas may be of any desired shape.

Next, the crowd analyzer 56 determines whether the new and old bounding boxes overlap (step 1208). If so, the crowd analyzer 56 creates a bounding box encompassing the new and old bounding boxes (step 1210). For example, if the new and old bounding boxes are 40×40 meter regions and a 1×1 meter square at the northeast corner of the new bounding box overlaps a 1×1 meter square at the southwest corner of the old bounding box, the crowd analyzer 56 may create a 79×79 meter square bounding box encompassing both the new and old bounding boxes.

The crowd analyzer 56 then determines the individual users and crowds relevant to the bounding box created in step 1210 (step 1212). The crowds relevant to the bounding box are crowds that are within or overlap the bounding box (e.g., have at least one user located within the bounding box). The individual users relevant to the bounding box are users that are currently located within the bounding box and not already part of a crowd. Next, the crowd analyzer 56 computes an optimal inclusion distance for individual users based on user density within the bounding box (step 1214). More specifically, in one embodiment, the optimal inclusion distance for individuals, which is also referred to herein as an initial optimal inclusion distance, is set according to the following equation:

$$\text{initial\_optimal\_inclusion\_dist} = a \cdot \sqrt{\frac{A_{BoundingBox}}{\text{number\_of\_users}}}, \quad \text{Eqn. (1)}$$

where a is a number between 0 and 1, $A_{BoundingBox}$ is an area of the bounding box, and number_of_users is the total number of users in the bounding box. The total number of users in the bounding box includes both individual users that are not already in a crowd and users that are already in a crowd. In one embodiment, a is ⅔.

The crowd analyzer 56 then creates a crowd for each individual user within the bounding box that is not already included in a crowd and sets the optimal inclusion distance for the crowds to the initial optimal inclusion distance (step 1216). At this point, the process proceeds to FIG. 6B where the crowd analyzer 56 analyzes the crowds relevant to the bounding box to determine whether any of the crowd members (i.e., users in the crowds) violate the optimal inclusion distance of their crowds (step 1218). Any crowd member that violates the optimal inclusion distance of his or her crowd is then removed from that crowd (step 1220). The crowd analyzer 56 then creates a crowd of one user for inclusion distance for the newly created crowds to the initial optimal inclusion distance (step 1222).

Next, the crowd analyzer 56 determines the two closest crowds for the bounding box (step 1224) and a distance between the two closest crowds (step 1226). The distance between the two closest crowds is the distance between the crowd centers of the two closest crowds. The crowd analyzer 56 then determines whether the distance between the two closest crowds is less than the optimal inclusion distance of a larger of the two closest crowds (step 1228). If the two closest crowds are of the same size (i.e., have the same number of users), then the optimal inclusion distance of either of the two closest crowds may be used. Alternatively, if the two closest crowds are of the same size, the optimal inclusion distances of both of the two closest crowds may be used such that the crowd analyzer 56 determines whether the distance between the two closest crowds is less than the optimal inclusion distances of both of the two closest crowds. As another alternative, if the two closest crowds are of the same size, the crowd analyzer 56 may compare the distance between the two closest crowds to an average of the optimal inclusion distances of the two closest crowds.

If the distance between the two closest crowds is not less than the optimal inclusion distance, then the process proceeds to step 1238. Otherwise, the two closest crowds are combined or merged (step 1230), and a new crowd center for the resulting crowd is computed (step 1232). A center of mass algorithm may be used to compute the crowd center of a crowd. In addition, a new optimal inclusion distance for the resulting crowd is computed (step 1234). In one embodiment, the new optimal inclusion distance for the resulting crowd is computed as:

$$\text{average} = \frac{1}{n+1} \cdot \left( \text{initial\_optimal\_inclusion\_dist} + \sum_{i=1}^{n} d_i \right), \quad \text{Eqn. (2)}$$

$$\text{optimal\_inclusion\_dist} = \text{average} + \sqrt{\left(\frac{1}{n} \cdot \sum_{i=1}^{n} (d_i - \text{average})^2\right)} \quad \text{Eqn. (3)}$$

where n is the number of users in the crowd and $d_i$ is a distance between the ith user and the crowd center. In other words, the new optimal inclusion distance is computed as the average of the initial optimal inclusion distance and the distances between the users in the crowd and the crowd center plus one standard deviation.

At this point, the crowd analyzer 56 determines whether a maximum number of iterations have been performed (step 1236). The maximum number of iterations is a predefined number that ensures that the crowd formation process does not indefinitely loop over steps 1218 through 1234 or loop over steps 1218 through 1234 more than a desired maximum number of times. If the maximum number of iterations has not been reached, the process returns to step 1218 and is repeated until either the distance between the two closest crowds is not less than the optimal inclusion distance of the larger crowd or the maximum number of iterations has been reached. At that point, the crowd analyzer 56 discards crowds with less than three users, or members (step 1238), and the process ends.

Figure 6A:
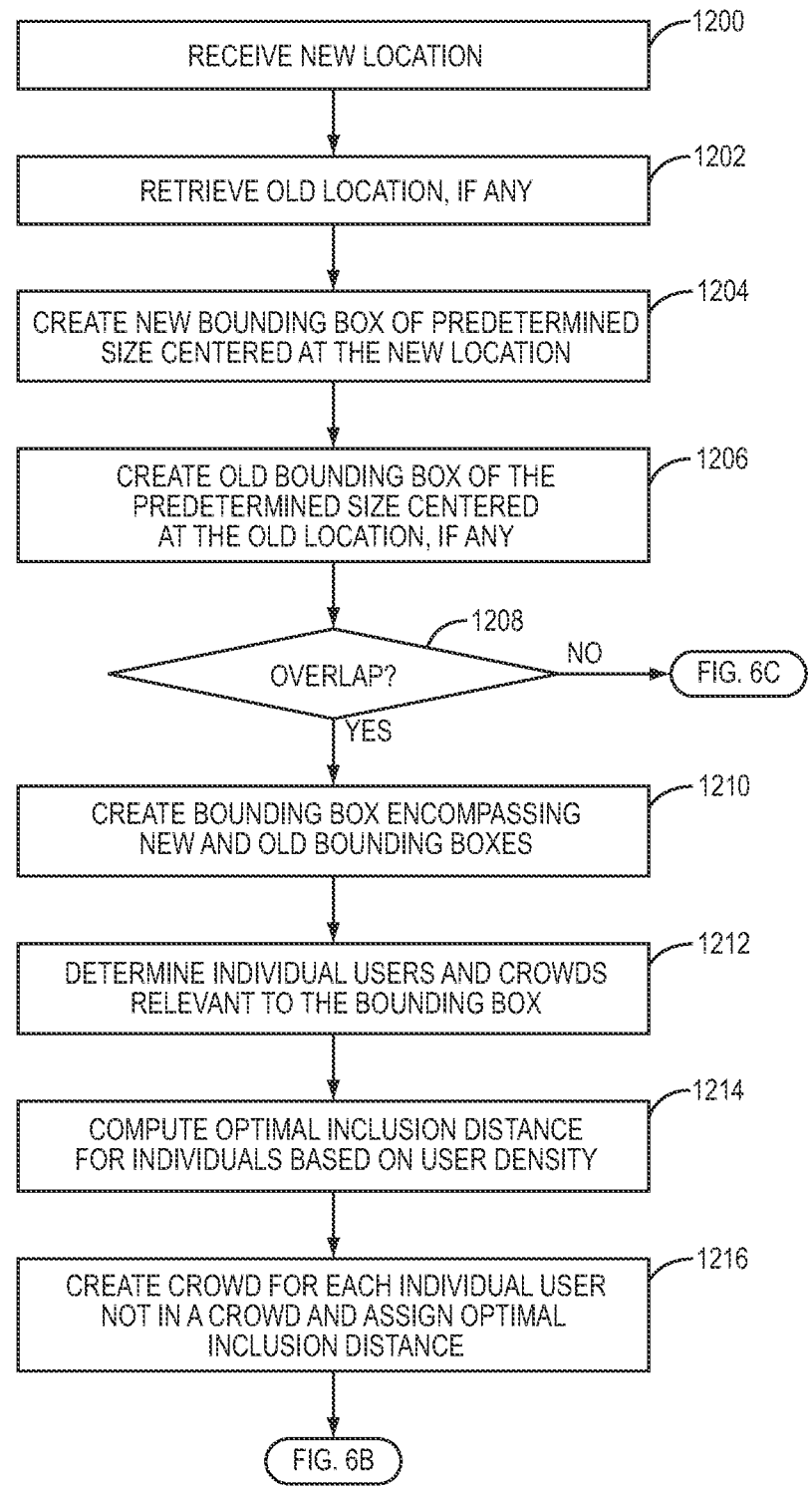
FIGS. 6A through 6D illustrate a flow chart for a spatial crowd formation process according to one embodiment of the present disclosure.
Figure 6B:
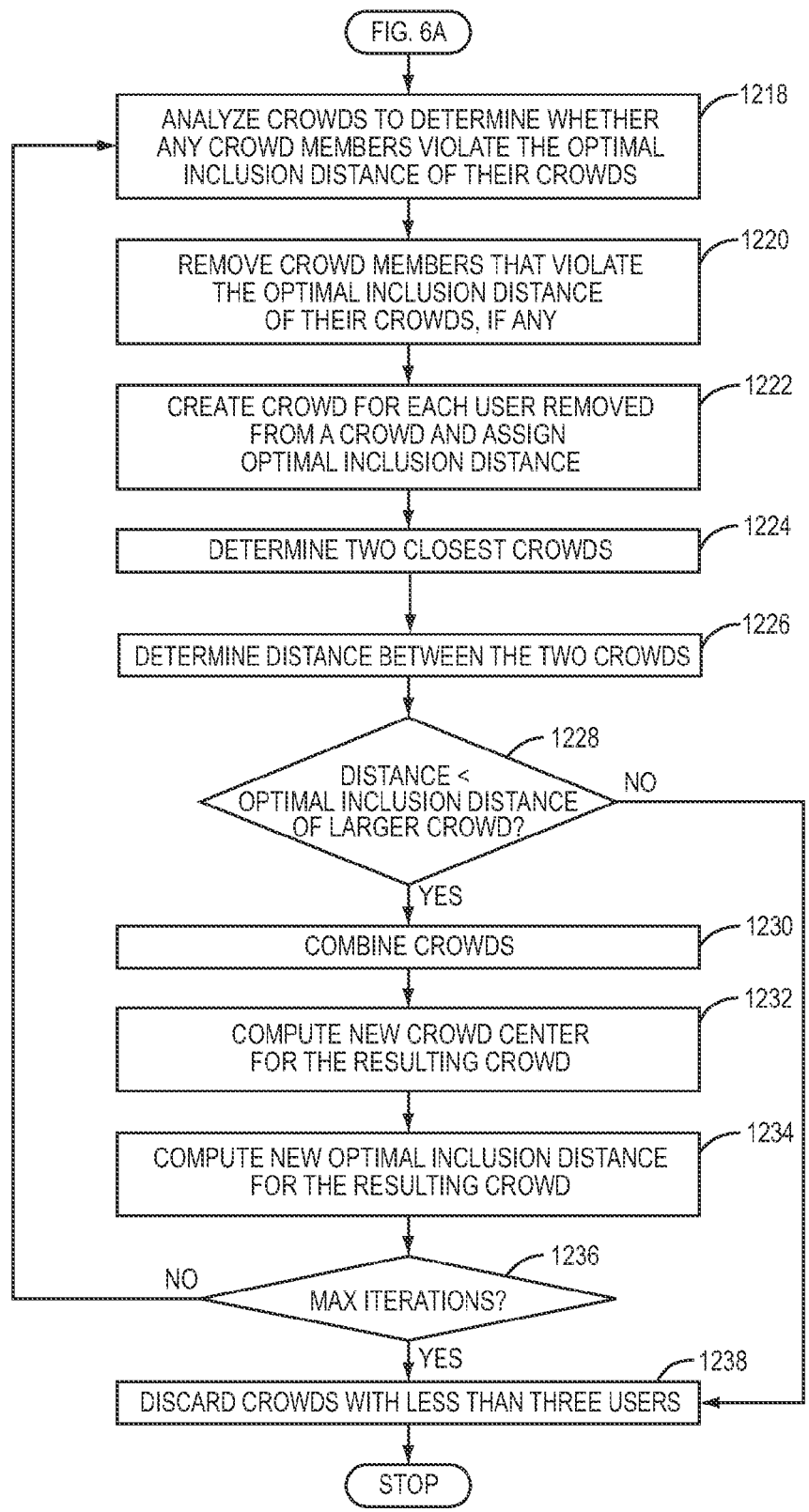
Figure 6C:
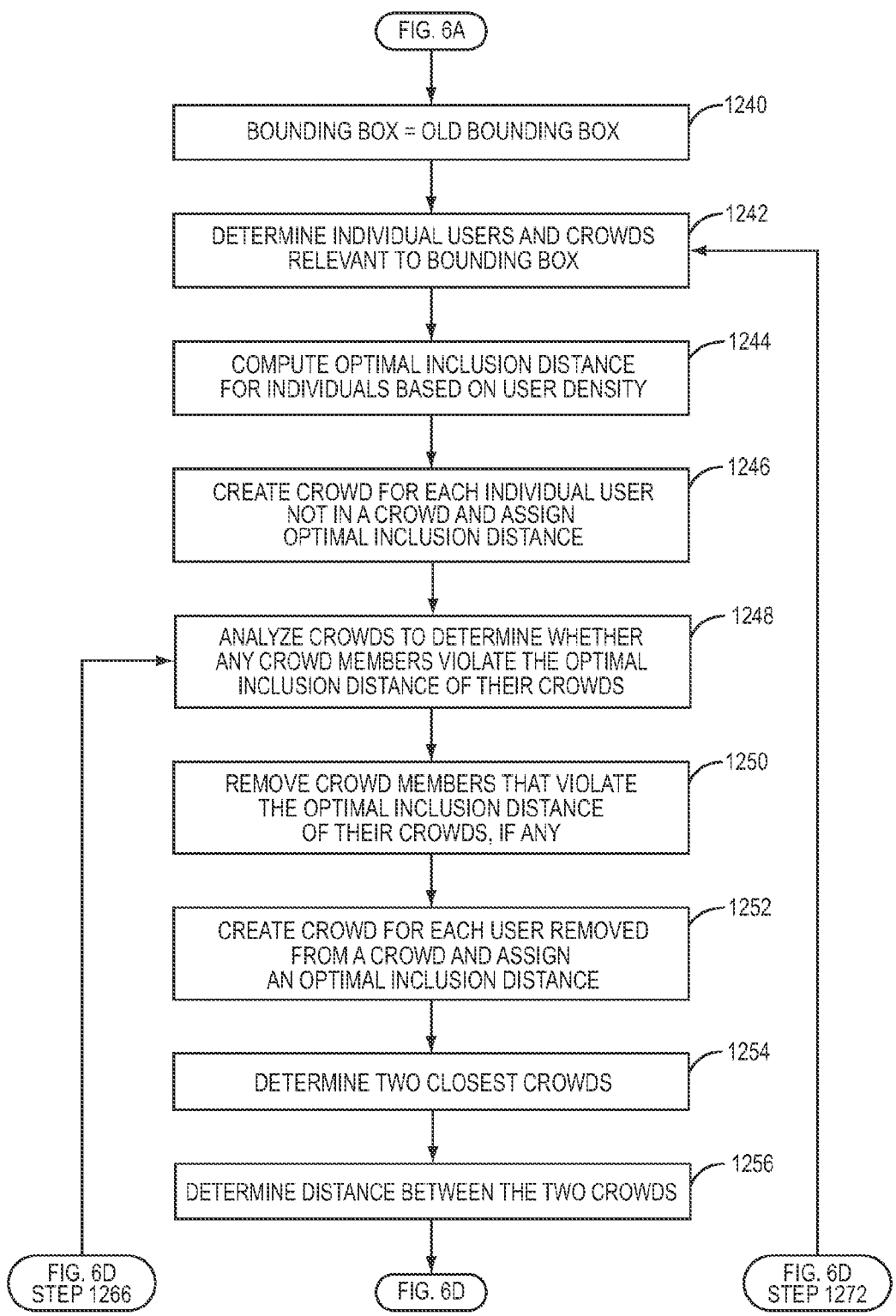
Figure 6D:
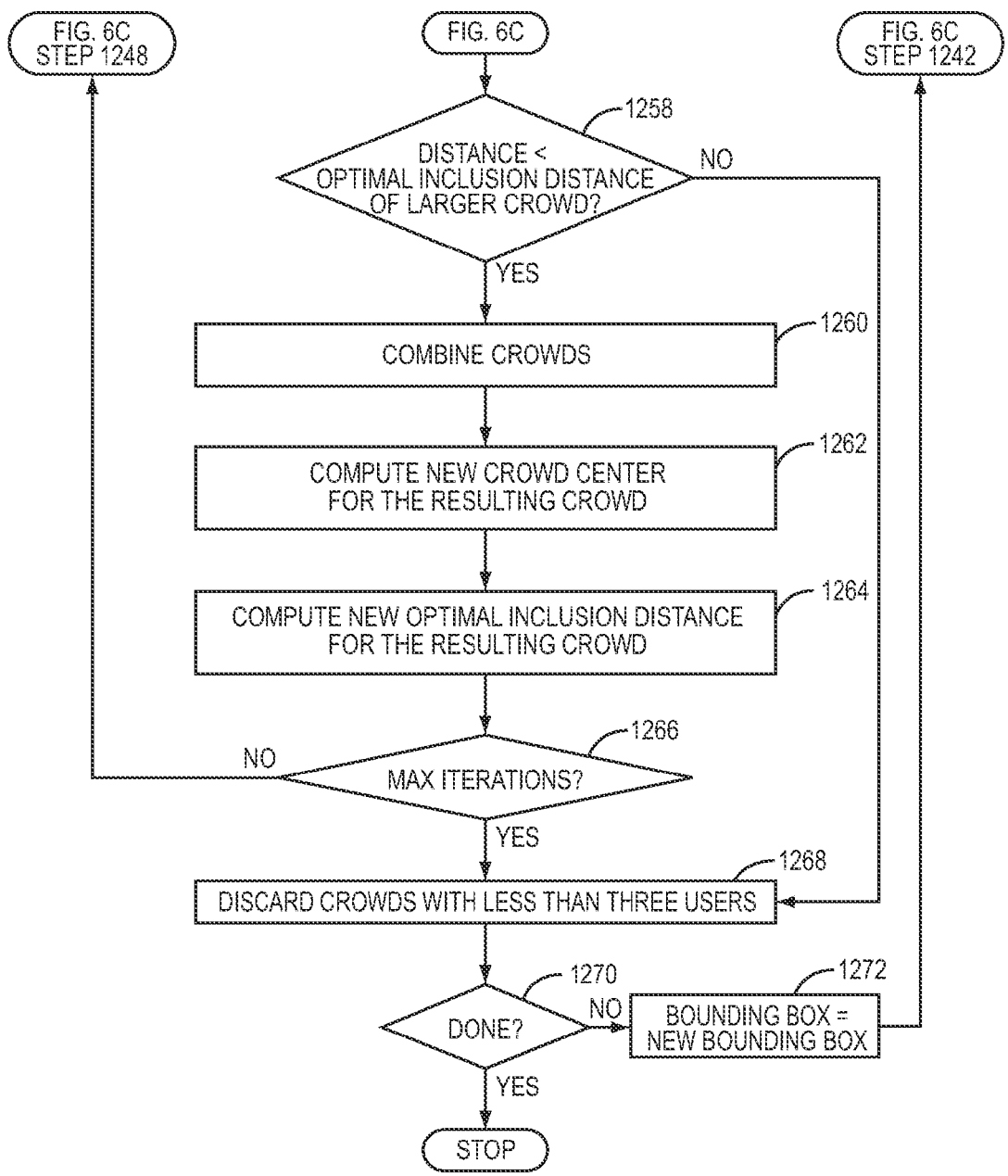

Returning to step 1208 in FIG. 6A, if the new and old bounding boxes do not overlap, the process proceeds to FIG. 6C and the bounding box to be processed is set to the old bounding box (step 1240). In general, the crowd analyzer 56 then processes the old bounding box in much the same manner as described above with respect to steps 1212 through 1238. More specifically, the crowd analyzer 56 determines the individual users and crowds relevant to the bounding box (step 1242). The crowds relevant to the bounding box are crowds that are within or overlap the bounding box (e.g., have at least one user located within the bounding box). The individual users relevant to the bounding box are users that are currently located within the bounding box and not already part of a crowd. Next, the crowd analyzer 56 computes an optimal inclusion distance for individual users based on user density within the bounding box (step 1244). More specifically, in one embodiment, the optimal inclusion distance for individuals, which is also referred to herein as an initial optimal inclusion distance, is set according to the following equation:

$$\text{initial\_optimal\_inclusion\_dist} = a \cdot \sqrt{\frac{A_{BoundingBox}}{\text{number\_of\_users}}}, \quad \text{Eqn. (4)}$$

where a is a number between 0 and 1, $A_{BoundingBox}$ is an area of the bounding box, and number_of_users is the total number of users in the bounding box. The total number of users in the bounding box includes both individual users that are not already in a crowd and users that are already in a crowd. In one embodiment, a is ⅔.

The crowd analyzer 56 then creates a crowd of one user for each individual user within the bounding box that is not already included in a crowd and sets the optimal inclusion distance for the crowds to the initial optimal inclusion distance (step 1246). At this point, the crowd analyzer 56 analyzes the crowds for the bounding box to determine whether any crowd members (i.e., users in the crowds) violate the optimal inclusion distance of their crowds (step 1248). Any crowd member that violates the optimal inclusion distance of his or her crowd is then removed from that crowd (step 1250). The crowd analyzer 56 then creates a crowd of one user for each of the users removed from their crowds in step 1250 and sets the optimal inclusion distance for the newly created crowds to the initial optimal inclusion distance (step 1252).

Next, the crowd analyzer 56 determines the two closest crowds in the bounding box (step 1254) and a distance between the two closest crowds (step 1256). The distance between the two closest crowds is the distance between the crowd centers of the two closest crowds. The crowd analyzer 56 then determines whether the distance between the two closest crowds is less than the optimal inclusion distance of a larger of the two closest crowds (step 1258). If the two closest crowds are of the same size (i.e., have the same number of users), then the optimal inclusion distance of either of the two closest crowds may be used. Alternatively, if the two closest crowds are of the same size, the optimal inclusion distances of both of the two closest crowds may be used such that the crowd analyzer 56 determines whether the distance between the two closest crowds is less than the optimal inclusion distances of both of the two closest crowds. As another alternative, if the two closest crowds are of the same size, the crowd analyzer 56 may compare the distance between the two closest crowds to an average of the optimal inclusion distances of the two closest crowds.

If the distance between the two closest crowds is not less than the optimal inclusion distance, the process proceeds to step 1268. Otherwise, the two closest crowds are combined or merged (step 1260), and a new crowd center for the resulting crowd is computed (step 1262). Again, a center of mass algorithm may be used to compute the crowd center of a crowd. In addition, a new optimal inclusion distance for the resulting crowd is computed (step 1264). As discussed above, in one embodiment, the new optimal inclusion distance for the resulting crowd is computed as:

$$\text{average} = \frac{1}{n+1} \cdot \left( \text{initial\_optimal\_inclusion\_dist} + \sum_{i=1}^{n} d_i \right), \quad \text{Eqn. (5)}$$

$$\text{optimal\_inclusion\_dist} = \text{average} + \sqrt{\left( \frac{1}{n} \cdot \sum_{i=1}^{n} (d_i - \text{average})^2 \right)} \quad \text{Eqn. (6)}$$

where n is the number of users in the crowd and $d_i$ is a distance between the ith user and the crowd center. In other words, the new optimal inclusion distance is computed as the average of the initial optimal inclusion distance and the distances between the users in the crowd and the crowd center plus one standard deviation.

At this point, the crowd analyzer 56 determines whether a maximum number of iterations have been performed (step 1266). If the maximum number of iterations has not been reached, the process returns to step 1248 and is repeated until either the distance between the two closest crowds is not less than the optimal inclusion distance of the larger crowd or the maximum number of iterations has been reached. At that point, the crowd analyzer 56 discards crowds with less than three users, or members (step 1268). The crowd analyzer 56 then determines whether the crowd formation process for the new and old bounding boxes is done (step 1270). In other words, the crowd analyzer 56 determines whether both the new and old bounding boxes have been processed. If not, the bounding box is set to the new bounding box (step 1272), and the process returns to step 1242 and is repeated for the new bounding box. Once both the new and old bounding boxes have been processed, the crowd formation process ends.

Figure 7A:
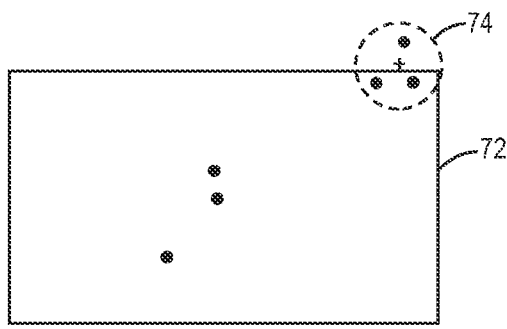
Figure 7B:
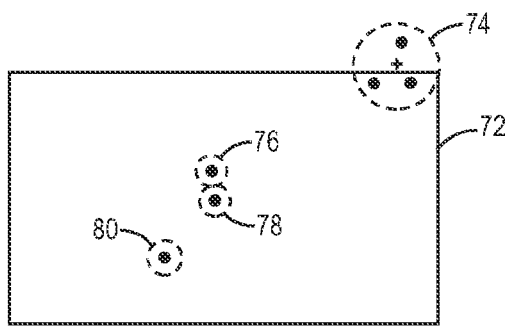

FIGS. 7A through 7D graphically illustrate the crowd formation process of FIGS. 6A through 6D for a scenario where the crowd formation process is triggered by a location update for a user having no old location. In this scenario, the crowd analyzer 56 creates a new bounding box 72 for the new location of the user, and the new bounding box 72 is set as the bounding box to be processed for crowd formation. Then, as illustrated in FIG. 7A, the crowd analyzer 56 identifies all individual users currently located within the new bounding box 72 and all crowds located within or overlapping the new bounding box 72. In this example, crowd 74 is an existing crowd relevant to the new bounding box 72. Crowds are indicated by dashed circles, crowd centers are indicated by cross-hairs (+), and users are indicated as dots. Next, as illustrated in FIG. 7B, the crowd analyzer 56 creates crowds 76 through 80 of one user for the individual users, and the optimal inclusion distances of the crowds 76 through 80 are set to the initial optimal inclusion distance. As discussed above, the initial optimal inclusion distance is computed by the crowd analyzer 56 based on a density of users within the new bounding box 72.

Figure 7C:
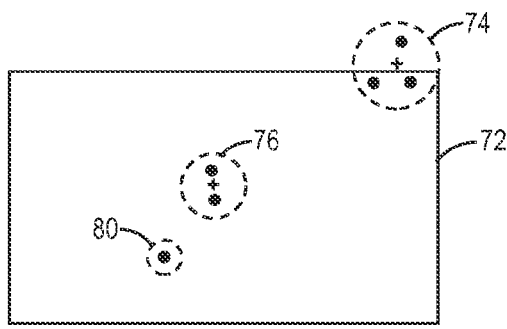
Figure 7D:
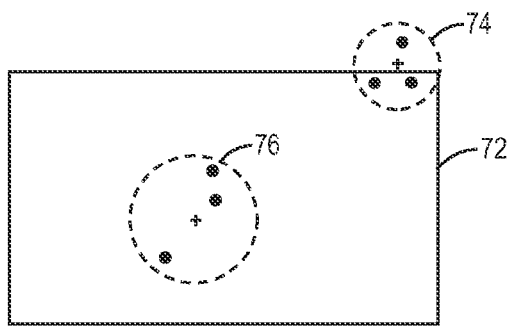

The crowd analyzer 56 then identifies the two closest crowds 76 and 78 in the new bounding box 72 and determines a distance between the two closest crowds 76 and 78. In this example, the distance between the two closest crowds 76 and 78 is less than the optimal inclusion distance. As such, the two closest crowds 76 and 78 are merged and a new crowd center and new optimal inclusion distance are computed, as illustrated in FIG. 7C. The crowd analyzer 56 then repeats the process such that the two closest crowds 76 and 80 in the new bounding box 72 are again merged, as illustrated in FIG. 7D. At this point, the distance between the two closest crowds 74 and 76 is greater than the appropriate optimal inclusion distance. As such, the crowd formation process is complete.

Figure 8A:
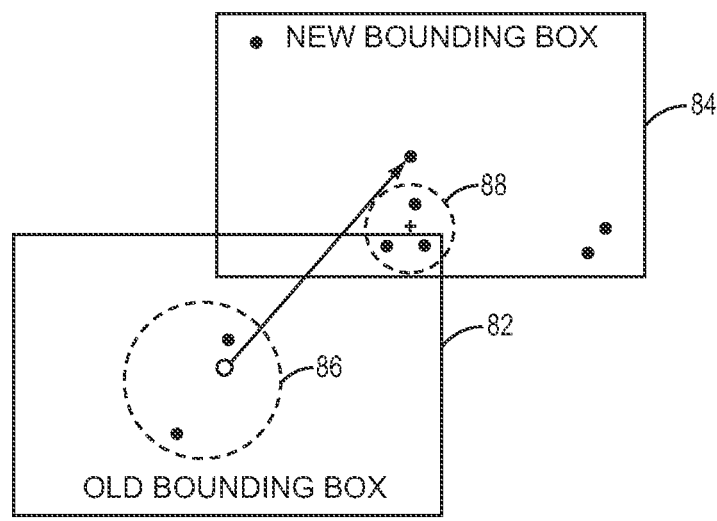

FIGS. 8A through 8F graphically illustrate the crowd formation process of FIGS. 6A through 6D for a scenario where the new and old bounding boxes overlap. As illustrated in FIG. 8A, a user moves from an old location to a new location, as indicated by an arrow. The crowd analyzer 56 receives a location update for the user giving the new location of the user. In response, the crowd analyzer 56 creates an old bounding box 82 for the old location of the user and a new bounding box 84 for the new location of the user. Crowd 86 exists in the old bounding box 82, and crowd 88 exists in the new bounding box 84.

Figure 8B:
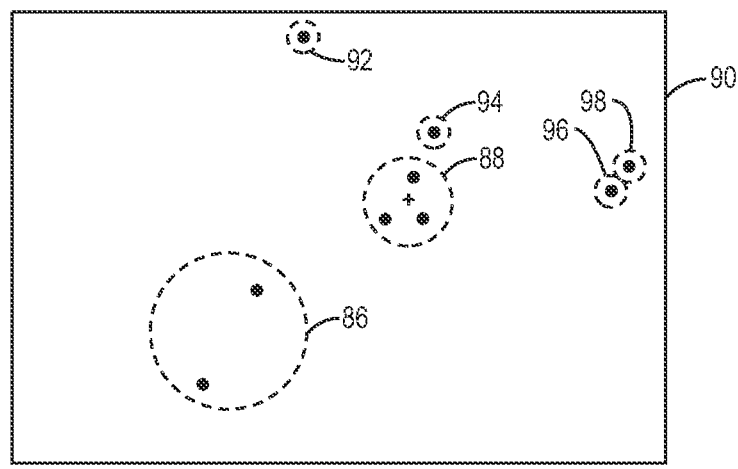

Since the old bounding box 82 and the new bounding box 84 overlap, the crowd analyzer 56 creates a bounding box 90 that encompasses both the old bounding box 82 and the new bounding box 84, as illustrated in FIG. 8B. In addition, the crowd analyzer 56 creates crowds 92 through 98 for individual users currently located within the bounding box 90. The optimal inclusion distances of the crowds 92 through 98 are set to the initial optimal inclusion distance computed by the crowd analyzer 56 based on the density of users in the bounding box 90.

Figure 8C:
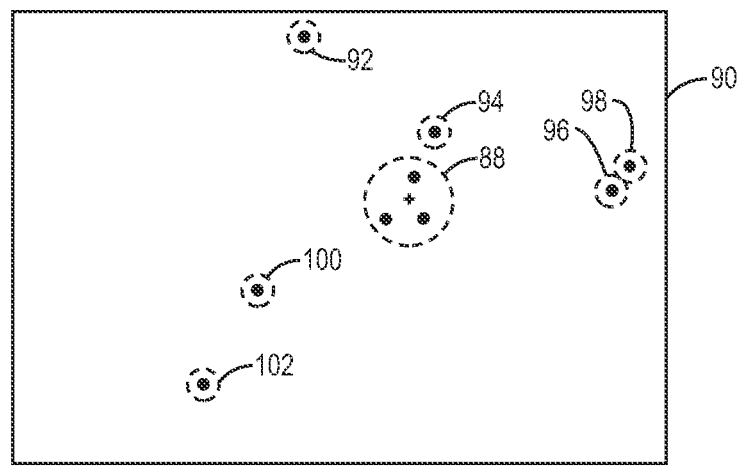

Next, the crowd analyzer 56 analyzes the crowds 86, 88, and 92 through 98 to determine whether any members of the crowds 86, 88, and 92 through 98 violate the optimal inclusion distances of the crowds 86, 88, and 92 through 98. In this example, as a result of the user leaving the crowd 86 and moving to his new location, both of the remaining members of the crowd 86 violate the optimal inclusion distance of the crowd 86. As such, the crowd analyzer 56 removes the remaining users from the crowd 86 and creates crowds 100 and 102 of one user each for those users, as illustrated in FIG. 8C.

Figure 8D:
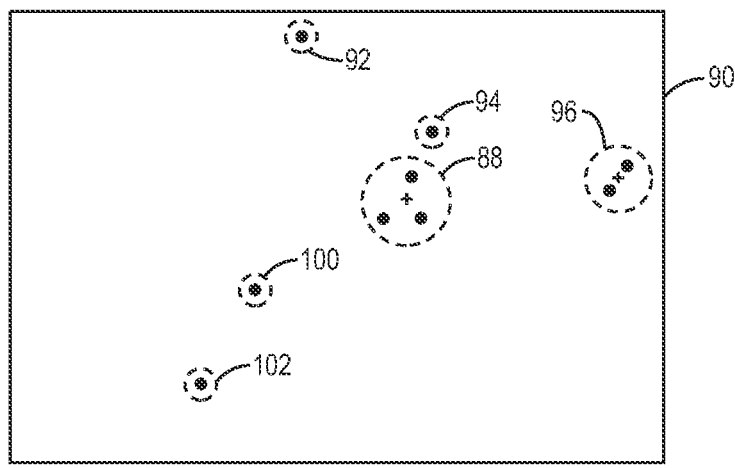

The crowd analyzer 56 then identifies the two closest crowds in the bounding box 90, which in this example are the crowds 96 and 98. Next, the crowd analyzer 56 computes a distance between the two crowds 96 and 98. In this example, the distance between the two crowds 96 and 98 is less than the initial optimal inclusion distance and, as such, the two crowds 96 and 98 are combined. In this example, crowds are combined by merging the smaller crowd into the larger crowd. Since the two crowds 96 and 98 are of the same size, the crowd analyzer 56 merges the crowd 98 into the crowd 96, as illustrated in FIG. 8D. A new crowd center and new optimal inclusion distance are then computed for the crowd 96.

Figure 8E:
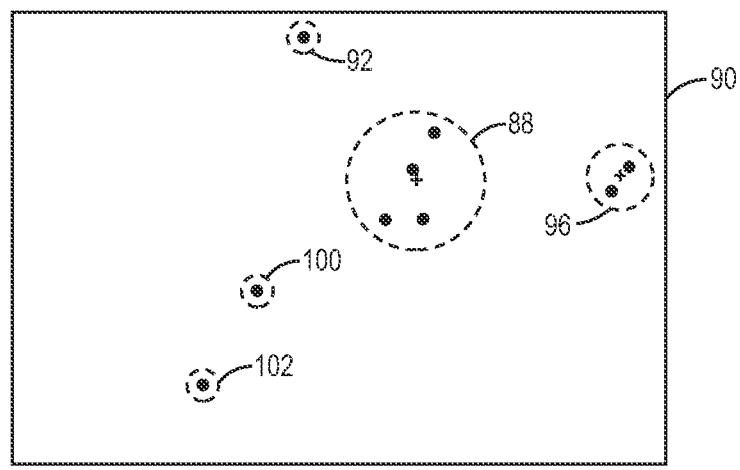
Figure 8F:
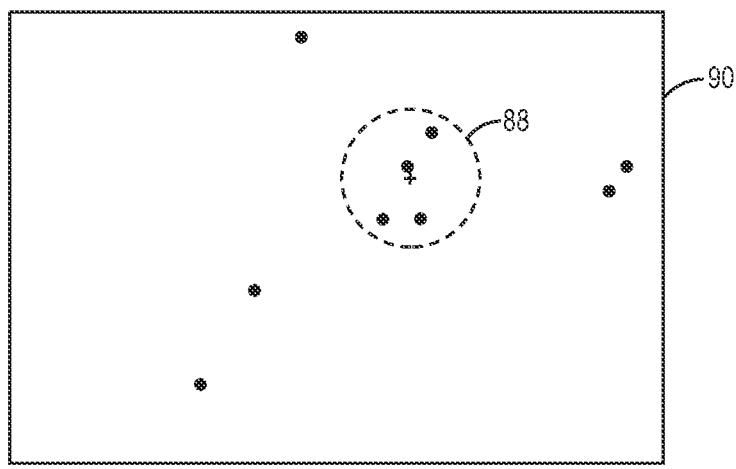

At this point, the crowd analyzer 56 repeats the process and determines that the crowds 88 and 94 are now the two closest crowds. In this example, the distance between the two crowds 88 and 94 is less than the optimal inclusion distance of the larger of the two crowds 88 and 94, which is the crowd 88. As such, the crowd 94 is merged into the crowd 88 and a new crowd center and optimal inclusion distance are computed for the crowd 88, as illustrated in FIG. 8E. At this point, there are no two crowds closer than the optimal inclusion distance of the larger of the two crowds. As such, the crowd analyzer 56 discards any crowds having less than three members, as illustrated in FIG. 8F. In this example, the crowds 92, 96, 100, and 102 have less than three members and are therefore removed. The crowd 88 has three or more members and, as such, is not removed. At this point, the crowd formation process is complete.

Figure 9A:
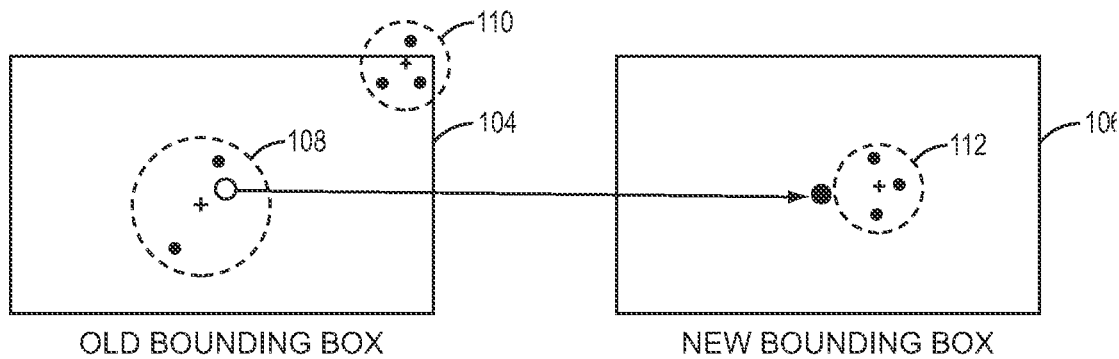

FIGS. 9A through 9E graphically illustrate the crowd formation process of FIGS. 6A through 6D in a scenario where the new and old bounding boxes do not overlap. As illustrated in FIG. 9A, in this example, a user moves from an old location to a new location. The crowd analyzer 56 creates an old bounding box 104 for the old location of the user and a new bounding box 106 for the new location of the user. Crowds 108 and 110 exist in the old bounding box 104, and crowd 112 exists in the new bounding box 106. In this example, since the old and new bounding boxes 104 and 106 do not overlap, the crowd analyzer 56 processes the old and new bounding boxes 104 and 106 separately.

Figure 9B:
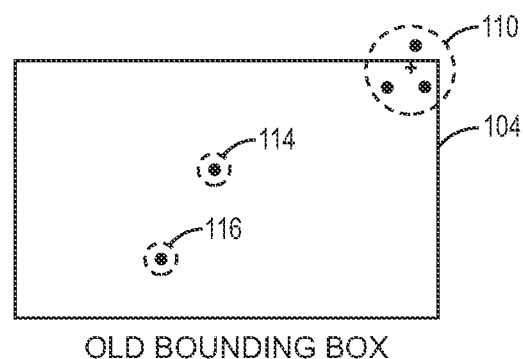
Figure 9C:
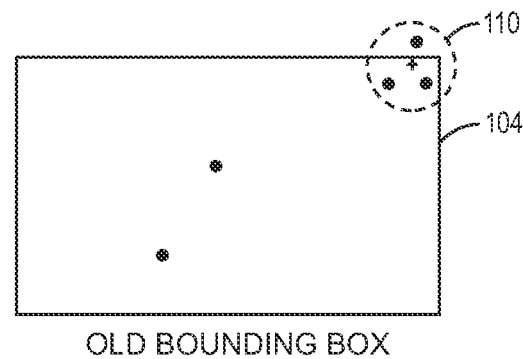

More specifically, as illustrated in FIG. 9B, as a result of the movement of the user from the old location to the new location, the remaining users in the crowd 108 no longer satisfy the optimal inclusion distance for the crowd 108. As such, the remaining users in the crowd 108 are removed from the crowd 108, and crowds 114 and 116 of one user each are created for the removed users as shown in FIG. 9B. In this example, no two crowds in the old bounding box 104 are close enough to be combined. As such, crowds having less than three users are removed as shown in FIG. 9C, and processing of the old bounding box 104 is complete, and the crowd analyzer 56 proceeds to process the new bounding box 106.

Figure 9D:
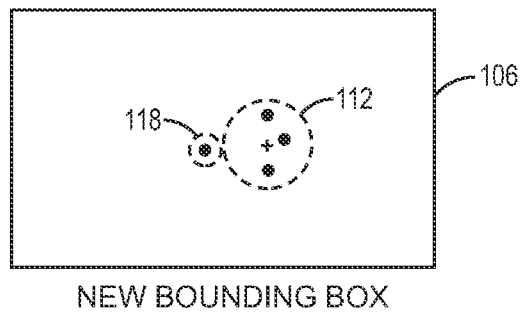
Figure 9E:
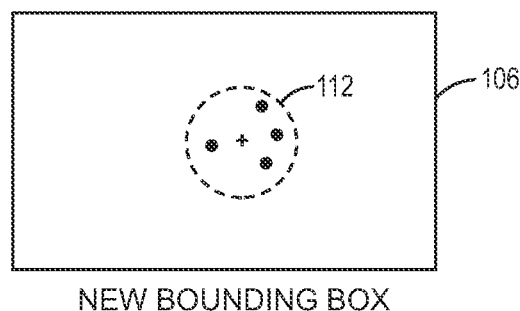

As illustrated in FIG. 9D, processing of the new bounding box 106 begins by the crowd analyzer 56 creating a crowd 118 of one user for the user. The crowd analyzer 56 then identifies the crowds 112 and 118 as the two closest crowds in the new bounding box 106 and determines a distance between the two crowds 112 and 118. In this example, the distance between the two crowds 112 and 118 is less than the optimal inclusion distance of the larger crowd, which is the crowd 112. As such, the crowd analyzer 56 combines the crowds 112 and 118 by merging the crowd 118 into the crowd 112, as illustrated in FIG. 9E. A new crowd center and new optimal inclusion distance are then computed for the crowd 112. At this point, the crowd formation process is complete. Note that the crowd formation processes described above with respect to FIGS. 6A through 9E are exemplary. The present disclosure is not limited thereto. Any type of crowd formation process may be used.

FIG. 10 illustrates a process for tagging micro-blog posts with crowd IDs of the crowds in which the corresponding users are located and distributing the micro-blog posts with the crowd ID tags according to one embodiment of the present disclosure. Note that, as discussed below in detail, this process may be performed by the micro-blog function 60 of the MAP server 12, the MAP applications 32 of the mobile devices 18, the micro-blogging service 26, or a combination thereof. First, a micro-blog post of one of the users 20 is obtained (step 1300). A crowd in which the user 20 is located is then determined (step 1302). Notably, the crowd in which the user 20 is located is the crowd in which the user 20 is located at the time of creating the micro-blog post. The micro-blog post is then tagged with a crowd ID of the crowd in which the user 20 is located, thereby providing a crowd ID tag for the micro-blog post (step 1304). In one embodiment, the micro-blog post is a tweet for the Twitter® micro-blogging and social networking service, and the crowd ID tag is implemented as a hash tag (e.g., #{Crowd ID}) appended or otherwise inserted into the tweet. Thus, if the tweet is "Having a great time!" and the crowd ID of the crowd is A942S, then the tweet may be tagged with the crowd ID by modifying the tweet to be "Having a great time! #A942S". Note, however, that the present disclosure is not limited to Twitter® tweets and hash tags. The micro-blog post may be any type of micro-blog post. Further, in one embodiment, the micro-blog post is tagged with the crowd ID by appending or otherwise inserting the crowd ID into a body of the micro-blog post. In another embodiment, the micro-blog post is tagged with the crowd ID by including the crowd ID as metadata for the micro-blog post. For example, the micro-blog post may be stored as an Extensible Markup Language (XML) file that includes a micro-blog post body (e.g., text message) and metadata (e.g., timestamp that defines a time at which the micro-blog post was made by the user 20, etc.), where the crowd ID tag is included in the metadata. Lastly, distribution of the micro-blog post including the crowd ID tag is effected (step 1306). The manner in which the micro-blog post is distributed varies depending on the particular embodiment, as described below. The process then returns to step 1300 and is repeated for each new micro-blog post received.

Note that while the embodiment of the crowd ID tag primarily discussed herein is one where the crowd ID tag is the actual crowd ID of the crowd, the crowd ID tag is not limited thereto. In another embodiment, the crowd ID tag may not be the crowd ID itself, but may be a unique string generated from the crowd ID, or a string that uniquely maps to the crowd ID. This may be desirable in embodiments where the crowd ID tag has to be inserted within the message body of the micro-blog post. This would have multiple benefits, including reducing the number of characters occupied by the tag; avoiding generating unsightly strings of characters meaningless to users; and meeting character length restrictions imposed by the micro-blogging service 26 (for instance, Twitter® enforces a 140-character limit on all blog posts). As an example, a crowd ID may be a 32-bit or even a 64-bit numeric value, or variable length strings, which may result in a very long string when converted to text. Furthermore, this string would be relevant to the MAP application 32, the MAP server 12, and the micro-blogging service 26, but would have no relevance to a user. Hence, to reduce the number of characters required by the tag a shorter alphanumeric string may be generated, associated with the crowd ID, and then used to tag the micro-blog post. In one embodiment, the shorter string is generated from the crowd ID itself, using a method that can be easily reversed to obtain the original crowd ID. One possible method may be to apply a hash function to the crowd ID to generate a string to be used as the crowd ID tag. Another method may be to generate a random string using a random number generator, and associating that string with the crowd ID at the MAP application 32, the MAP server 12, and the micro-blogging service 26 or any combination of these, such that the crowd ID can be obtained given the generated string. As an additional precaution, previous randomly generated strings may be persisted in a database, and newly generated strings may be checked against these to ensure that a string does not get re-used. Yet another method may be to convert a numeric crowd ID value from base-2 (binary format) to base-N, assign a unique alphanumeric character to each of the N base-N digits, and represent the crowd ID tag as the resulting string of alphanumeric characters, where N is greater than 2. The alphanumeric characters may utilize any of a number of possible character encoding schemes, such as ASCII or Unicode. As an example, a base-64 encoding could be adopted, where the 64 unique characters include, in order, the 10 digits (0 through 9), 26 lower-case letters (a through z), 26 upper-case letters (A through Z), a hyphen (-) and an underscore (_). Hence, a 32-bit numeric crowd ID having decimal value 606355638 and binary representation 00100100001001000100000010110110 would translate to a text string 'A942S,' which is shorter than either binary or decimal representation. This method can be trivially reversed to obtain the original crowd ID from the resulting string. Note that this is a simplified example, and more sophisticated methods may be used. Furthermore, methods resulting in strings that resemble real words may be used, such that the resulting tag appears relatively less nonsensical to users. Note that the tag may be specifically formatted to identify it as being generated by the MAP application 32 or the MAP server 12, and to differentiate it from other tags that may be added, for instance, by the user. As an example, all MAP-generated hash tags may begin with the string "CL," e.g.

"#CLA942S." Thus, as used herein, a "crowd ID tag" is to be understood as being either the actual crowd ID of the corresponding crowd or a unique string that is either derived from or maps to the actual crowd ID of the crowd.

FIG. 11 illustrates the operation of the system 10 to tag micro-blog posts with crowd IDs of the crowds in which the corresponding users are located and distribute the micro-blog posts with the crowd ID tags according to one embodiment of the present disclosure. In this embodiment, the micro-blog function 60 of the MAP server 12 registers with the micro-blogging service 26 as a "follower" of each of the users 20 (step 1400). In other words, the micro-blogging service 26 subscribes to all micro-blog posts published by the users 20 that it "follows." Some time thereafter, a micro-blog post is sent from the mobile device 18 of one of the users 20 to the micro-blogging service 26 (step 1402). More specifically, in one embodiment, the MAP application 32 of the mobile device 18 includes a micro-blog feature that enables the user 20 to create the micro-blog post and initiate the sending of the micro-blog post to the micro-blogging service 26. Upon receiving the micro-blog post, the micro-blogging service 26 sends the micro-blog post to the micro-blog function 60 of the MAP server 12 as a follower of the user 20 (step 1404). Note that the micro-blogging service 26 may proactively publish the post to the MAP server 12 using a push mechanism, or the MAP server 12 may request newly published micro-blog posts from the micro-blogging service 26 using a pull mechanism, such as polling. The micro-blog post may be sent to the micro-blog function 60 of the MAP server 12 as part of publication of the micro-blog post to all followers of the user 20.

Upon receiving the micro-blog post, the micro-blog function 60 of the MAP server 12 determines a crowd in which the user 20 is located (step 1406). More specifically, the micro-blog function 60 determines the crowd in which the user 20 is located at the current time, which is substantially the same as the time at which the user 20 made the micro-blog post. In one embodiment, the MAP server 12 forms crowds using the process of FIGS. 6A through 6D. In this case, the micro-blog function 60 determines the crowd of the user 20 by querying the datastore 64 of the MAP server 12 for the crowd ID of the crowd in which the user 20 is located. The micro-blog function 60 then tags the micro-blog post with the crowd ID of the crowd (step 1408). As discussed above, the micro-blog post may be tagged with the crowd ID by appending the crowd ID to or otherwise inserting the crowd ID into the body of the micro-blog post (e.g., a hash tag for a Twitter® tweet) or including the crowd ID in metadata of the micro-blog post.

Next, the micro-blog function 60 sends the micro-blog post including the crowd ID tag to the micro-blogging service 26 (step 1410). In this embodiment, the micro-blog function 60 of the MAP server 12 is registered with the micro-blogging service 26 such that the micro-blog function 60 is enabled to make micro-blog posts. Thus, in step 1410, the micro-blog function 60 sends the micro-blog post including the crowd ID tag to the micro-blogging service 26 as a post of the micro-blog function 60 of the MAP server 12. For example, in one embodiment, the micro-blogging service 26 is the Twitter® micro-blogging and social networking service, and the micro-blog function 60 of the MAP server 12 has a Twitter® account. Then, in step 1410, the micro-blog post is sent to the Twitter® service as a tweet from the micro-blog function 60 of the MAP server 12. In this manner, the micro-blog post including the crowd ID tag is anonymized in that the micro-blog post sent in step 1410 does not identify the user 20 as the originator of the micro-blog post. Upon receiving the micro-blog post in step 1410, the micro-blogging service 26 publishes the micro-blog post including the crowd ID tag (step 1412). Notably, steps 1402 through 1412 are repeated for additional micro-blog posts made by the user 20 as well as micro-blog posts made by other users 20.

FIG. 12 illustrates a process for publishing the micro-blog post of FIG. 11 according to one embodiment of the present disclosure. In this embodiment, the mobile devices 18-1 through 18-N register the users 20-1 through 20-N with the micro-blogging service 26 as followers of the MAP server 12 (steps 1500-1 through 1500-N). The micro-blogging service 26 receives a micro-blog post including a crowd ID tag from the micro-blog function 60 of the MAP server 12 (step 1502). Because the users 20-1 through 20-N are followers of the MAP server 12, the micro-blogging service 26 sends the micro-blog post to the mobile devices 18-1 through 18-N (steps 1504-1 through 1504-N).

In response, the MAP applications 32-1 through 32-N of the mobile devices 18-1 through 18-N filter the micro-blog post based on the crowd ID tag (steps 1506-1 through 1506-N). More specifically, in one embodiment, the MAP applications 32-1 through 32-N filter micro-blog posts made by the MAP server 12 such that only micro-blog posts tagged with the crowd IDs of desired crowds are presented to the users 20-1 through 20-N. Using the MAP application 32-1 as an example, in the preferred embodiment, the MAP application 32-1 filters micro-blog posts made by the MAP server 12 such that only the micro-blog posts tagged with the crowd ID of the crowd in which the user 20-1 is located pass through the filter to be presented to the user 20-1. In this manner, the users 20 in a crowd form an ad-hoc micro-blogging group, where micro-blog posts made by the users 20 in the ad-hoc micro-blogging group are published to the other users 20 in the ad-hoc micro-blogging group. However, in an alternative embodiment, the MAP application 32-1 filters micro-blog posts made by the MAP server 12 such that only the micro-blog posts tagged with the crowd ID(s) of a desired crowd(s) selected by the user 20-1 pass through the filter to be presented to the user 20-1. Lastly, the MAP applications 32-1 through 32-N present the micro-blog post to the users 20-1 through 20-N if the micro-blog post passes through the corresponding filters applied by the MAP applications 32-1 through 32-N (steps 1508-1 through 1508-N). Notably, steps 1502 through 1508 are repeated for additional micro-blog posts sent to the micro-blogging service 26 from the MAP server 12.

FIG. 13 illustrates a process for publishing the micro-blog post of FIG. 11 according to another embodiment of the present disclosure. In general, in this embodiment, rather than registering each of the users 20 as a follower of the MAP server 12, the MAP applications 32 of the mobile devices 18 of the users 20 query the micro-blogging service 26 for micro-blog posts tagged with desired crowd IDs. More specifically, the micro-blogging service 26 receives micro-blog posts including crowd ID tags from the MAP server 12 (step 1600). At some point in time, the MAP application 32 of one of the mobile devices 18 sends a search request to the micro-blogging service 26 for micro-blog posts tagged with a desired crowd ID (step 1602). The MAP application 32 may send the search request automatically or in response to a request from the user 20 of the mobile device 18. The desired crowd ID is the ID of a desired crowd. In the preferred embodiment, the desired crowd is a crowd in which the user 20 is currently located. In this manner, the crowd operates as an ad-hoc micro-blogging group, where the mobile device 18 obtains micro-blog posts made by the users 20 in the ad-hoc micro-blogging group. In an alternative embodiment, the desired crowd is a crowd selected by the user 20 of the mobile device

18. For instance, the MAP application 32 may present a map to the user 20 where crowds are displayed on the map at corresponding geographical locations. The user 20 may then select the desired crowd from the map to initiate the search request. Notably, the search request may include one or more additional search criteria such as, for example, a desired time range such that micro-blog posts returned in response to the search request have timestamps that fall within the desired time range.

In response to the search request, the micro-blogging service 26 performs a search for micro-blog posts tagged with the desired crowd ID (step 1604). More specifically, in this embodiment, the micro-blogging service 26 stores a repository of micro-blog posts. The micro-blogging service 26 searches the repository for micro-blog posts tagged with the desired crowd ID. Note that if any additional search criteria are defined in the search request, the additional search criteria are also used when performing the search. The micro-blogging service 26 then returns the micro-blog posts resulting from the search (i.e., the micro-blog posts tagged with the desired crowd ID and that satisfy any additional search criteria included in the search request) to the mobile device 18 (step 1606). The MAP application 32 of the mobile device 18 then presents the micro-blog posts to the user 20 (step 1608). Notably, using the process of FIG. 13, the user 20 is enabled to obtain micro-blog posts made by the users 20 in the desired crowd without necessarily being registered with the micro-blogging service 26 as a follower of the users 20 in the desired crowd. Note that since crowd IDs may be incorporated as text or hash tags in the micro-blog message body itself, the micro-blogging service 26 only needs to provide basic text indexing and searching services, or search services adapted for indexing and searching of hash tags, to be able to perform step 1604. As such, ad-hoc micro-blogging groups may be successfully established even if the micro-blogging service 26 is not aware of the existence of crowd IDs or configured to provide search capabilities specific to crowd IDs.

FIG. 14 illustrates the operation of the system 10 to tag micro-blog posts with crowd IDs of the crowds in which the corresponding users are located and distribute the micro-blog posts with the crowd ID tags according to another embodiment of the present disclosure. This embodiment is similar to that of FIG. 11. However, in this embodiment, rather than being published by the micro-blogging service 26, the micro-blog posts including the crowd ID tags are published by the MAP server 12. More specifically, in this embodiment, the micro-blog function 60 of the MAP server 12 registers with the micro-blogging service 26 as a "follower" of each of the users 20 (step 1700). Some time thereafter, a micro-blog post is sent from the mobile device 18 of one of the users 20 to the micro-blogging service 26 (step 1702). More specifically, in one embodiment, the MAP application 32 of the mobile device 18 includes a micro-blog feature that enables the user 20 to create the micro-blog post and initiate the sending of the micro-blog post to the micro-blogging service 26. Upon receiving the micro-blog post, the micro-blogging service 26 sends the micro-blog post to the micro-blog function 60 of the MAP server 12 as a follower of the user 20 (step 1704). The micro-blog post may be sent to the micro-blog function 60 of the MAP server 12 as part of publication of the micro-blog post to all followers of the user 20.

Upon receiving the micro-blog post, the micro-blog function 60 of the MAP server 12 determines a crowd in which the user 20 is located (step 1706). More specifically, the micro-blog function 60 determines the crowd in which the user 20 is located at the current time, which in this embodiment is substantially the same as the time at which the user 20 sent the micro-blog post. In one embodiment, the MAP server 12 forms crowds using the process of FIGS. 6A through 6D. In this case, the micro-blog function 60 determines the crowd of the user 20 by querying the datastore 64 of the MAP server 12 for the crowd ID of the crowd in which the user 20 is located. The micro-blog function 60 then tags the micro-blog post with the crowd ID of the crowd (step 1708). As discussed above, the micro-blog post may be tagged with the crowd ID by appending the crowd ID to or otherwise inserting the crowd ID into the body of the micro-blog post (e.g., a hash tag for a Twitter® tweet) or including the crowd ID in metadata of the micro-blog post. Lastly, the micro-blog function 60 publishes the micro-blog post including the crowd ID tag (step 1710). The manner in which the micro-blog post is published may vary depending on the particular embodiment, as described below. Notably, steps 1702 through 1710 are repeated for additional micro-blog posts made by the user 20 as well as micro-blog posts made by other users 20.

FIG. 15 illustrates a process for publishing the micro-blog post of FIG. 14 according to one embodiment of the present disclosure. In this embodiment, the micro-blog function 60 of the MAP server 12 receives micro-blog posts from the micro-blogging service 26 and tags the micro-blog posts with crowd IDs (step 1800). In order to publish the micro-blog posts, the micro-blog function 60 of the MAP server 12 sends the micro-blog posts including the crowd ID tags to the MAP applications 32 of the mobile devices 18 (steps 1802-1 through 1802-N). Notably, in this embodiment, all of the micro-blog posts received and tagged by the micro-blog function 60 are sent to all of the mobile devices 18.

The MAP applications 32 of the mobile devices 18 filter the micro-blog posts to pass only the micro-blog posts of desired crowds for presentation to the users 20 (steps 1804-1 through 1804-N). More specifically, for each mobile device 18, the MAP application 32 of the mobile device 18 filters the micro-blog posts to pass only those micro-blog posts tagged with a desired crowd ID. The desired crowd ID is the crowd ID of a desired crowd. In the preferred embodiment, the desired crowd is the crowd in which the user 20 of the mobile device 18 is located. In this manner, the users 20 in a crowd form an ad-hoc micro-blogging group, where micro-blog posts by the users 20 in the ad-hoc micro-blogging group are published to the other users 20 in the ad-hoc micro-blogging group. In an alternative embodiment, the desired crowd is a crowd selected by the user 20 of the mobile device 18. Lastly, the MAP applications 32 of the mobile devices 18 present the filtered micro-blog posts to the users 20 (steps 1806-1 through 1806-N).

FIG. 16 illustrates a process for publishing the micro-blog post of FIG. 14 according to another embodiment of the present disclosure. In this embodiment, the micro-blog function 60 of the MAP server 12 receives micro-blog posts from the micro-blogging service 26 and tags the micro-blog posts with crowd IDs (step 1900). At some point in time, the MAP application 32 of one of the mobile devices 18 sends a search request to the micro-blogging service 26 for micro-blog posts tagged with a desired crowd ID (step 1902). The MAP application 32 may send the search request automatically or in response to a request from the user 20 of the mobile device 18. The desired crowd ID is the ID of a desired crowd. In the preferred embodiment, the desired crowd is a crowd in which the user 20 is currently located. In this manner, the crowd operates as an ad-hoc micro-blogging group, where the mobile device 18 obtains micro-blog posts made by the users 20 in the ad-hoc micro-blogging group. In an alternative embodiment, the desired crowd is a crowd selected by the user 20 of the mobile device 18. Notably, the search request may include one or more additional search criteria such as, for example, a desired time range such that micro-blog posts returned in response to the search request have timestamps that fall within the desired time range.

In response to the search request, the micro-blog function 60 of the MAP server 12 performs a search for micro-blog posts tagged with the desired crowd ID (step 1904). More specifically, in this embodiment, the MAP server 12 stores a repository of micro-blog posts received from the micro-blogging service 26 and tagged with corresponding crowd IDs. The micro-blog function 60 searches the repository for micro-blog posts tagged with the desired crowd ID. Note that if any additional search criteria are defined in the search request, the additional search criteria are also used when performing the search. The micro-blog function 60 then returns the micro-blog posts resulting from the search (i.e., the micro-blog posts tagged with the desired crowd ID and that satisfy any additional search criteria included in the search request) to the mobile device 18 (step 1906). The MAP application 32 of the mobile device 18 then presents the micro-blog posts to the user 20 (step 1908).

FIG. 17 illustrates the operation of the system 10 to tag micro-blog posts with crowd IDs of the crowds in which the corresponding users are located and distribute the micro-blog posts with the crowd ID tags according to another embodiment of the present disclosure. In this embodiment, the mobile device 18 of one of the users 20 sends a micro-blog post to the MAP server 12 (step 2000). More specifically, in one embodiment, the MAP application 32 of the mobile device 18 includes a micro-blog feature that enables the user 20 to create the micro-blog post and initiate the sending of the micro-blog post to the MAP server 12 either via a communication channel provided by the MAP application 32 directly to the MAP server 12 or via a direct messaging scheme provided by the micro-blogging service 26, depending on the particular implementation. Upon receiving the micro-blog post, the micro-blog function 60 of the MAP server 12 determines a crowd in which the user 20 of the mobile device 18 is located (step 2002). More specifically, the micro-blog function 60 determines the crowd in which the user 20 is located at the current time, which in this embodiment is substantially the same as the time at which the user 20 made the micro-blog post. In one embodiment, the MAP server 12 forms crowds using the process of FIGS. 6A through 6D. In this case, the micro-blog function 60 determines the crowd of the user 20 by querying the datastore 64 of the MAP server 12 for the crowd ID of the crowd in which the user 20 is located. The micro-blog function 60 then tags the micro-blog post with the crowd ID of the crowd (step 2004). As discussed above, the micro-blog post may be tagged with the crowd ID by appending the crowd ID to or otherwise inserting the crowd ID into the body of the micro-blog post (e.g., a hash tag for a Twitter® tweet) or including the crowd ID in metadata of the micro-blog post.

Next, the micro-blog function 60 of the MAP server 12 sends the micro-blog post including the crowd ID tag to the micro-blogging service 26 (step 2006). In the preferred embodiment, the micro-blog post is sent as a micro-blog post of the MAP server 12. In this manner, the micro-blog post is anonymized such that the user 20 is not identified as the sender, or originator, of the micro-blog post. However, in an alternative embodiment, the micro-blog function 60 sends the micro-blog post to the micro-blogging service 26 on behalf of the user 20. In this manner, the micro-blog post is not anonymous and may be published to followers of the user 20. Upon receiving the micro-blog post, the micro-blogging service 26 publishes the micro-blog post including the crowd ID tag (step 2008). The manner in which the micro-blog post is published may vary depending on the particular implementation. In one embodiment, the micro-blogging service 26 publishes the micro-blog post using the process of FIG. 12. In another embodiment, the micro-blogging service 26 publishes the micro-blog post using the process of FIG. 13. Notably, the processes of FIGS. 12 and 13 are exemplary publication processes and neither the embodiment of FIG. 11 nor the embodiment of FIG. 17 is limited thereto.

FIG. 18 illustrates the operation of the system 10 to tag micro-blog posts with crowd IDs of the crowds in which the corresponding users are located and distribute the micro-blog posts with the crowd ID tags according to another embodiment of the present disclosure. In the embodiments described above, tagging is performed by the MAP server 12. However, in this embodiment, tagging is performed by the MAP application 32 of the mobile device 18 of the sender of the micro-blog post. More specifically, the MAP application 32 generates a micro-blog post (step 2100). In one embodiment, the MAP application 32 enables the user 20 to define a body (e.g., a text message) of the micro-blog post and then generates the micro-blog post with the defined body. Next, the MAP application 32 requests a crowd ID of the current crowd of the user 20 from the MAP server 12 (step 2102). In response to the request, the micro-blog function 60 of the MAP server 12 determines the crowd in which the user 20 is located (step 2104) and returns the crowd ID of the crowd to the mobile device 18 (step 2106). Notably, while in this embodiment the crowd ID is obtained after generating the micro-blog post, the crowd ID may alternatively be obtained prior to generating the micro-blog post. In one embodiment, once the crowd ID is obtained by the mobile device 18, the crowd ID may be cached and re-used for future micro-blog posts by the user 20 until a threshold amount of time passes or until it is detected that the user's crowd has changed.

Next, the MAP application 32 tags the micro-blog post with the crowd ID of the crowd in which the user 20 is located (step 2108) and sends the micro-blog post including the crowd ID tag to the micro-blogging service 26 (step 2110). The micro-blogging service 26 then publishes the micro-blog post including the crowd ID tag (step 2112). In this embodiment, the micro-blog post is published as a micro-blog post of the user 20. However, in an alternative embodiment, the MAP application 32 may send the post as a micro-blog post of the MAP server 12 such that the MAP server 12, rather than the user 20, is identified as the sender of the micro-blog post (i.e., the micro-blog post is anonymized). Also, for this embodiment, the micro-blogging service 26 preferably publishes the micro-blog post using the process of FIG. 13 where the MAP applications 32 of the other users 20 search for micro-blog posts tagged with the desired crowd IDs. Notably, the process of FIG. 13 is an exemplary publication process and the embodiment of FIG. 18 is not limited thereto.

FIG. 19 illustrates the operation of the system 10 to tag micro-blog posts with crowd IDs of the crowds in which the corresponding users are located and distribute the micro-blog posts with the crowd ID tags according to another embodiment of the present disclosure. In this embodiment, tagging is performed by the MAP application 32 of the mobile device 18 of the sender of the micro-blog post. More specifically, the MAP application 32 generates a micro-blog post (step 2200). In one embodiment, the MAP application 32 enables the user 20 to define a body (e.g., a text message) of the micro-blog post and then generates the micro-blog post with the defined body. Next, the MAP application 32 requests a crowd ID of the current crowd of the user 20 from the MAP server 12 (step 2202). In response to the request, the micro-blog function 60 of the MAP server 12 determines the crowd in which the user 20 is located (step 2204) and returns the crowd ID of the crowd to the mobile device 18 (step 2206). Notably, while in this embodiment the crowd ID is obtained after generating the micro-blog post, the crowd ID may alternatively be obtained prior to generating the micro-blog post.

Next, the MAP application 32 tags the micro-blog post with the crowd ID of the crowd in which the user 20 is located (step 2208) and sends the micro-blog post including the crowd ID tag to the MAP server 12 (step 2210). The MAP application 32 may send the micro-blog post to the MAP server 12 via a direct communication channel between the MAP application 32 and the MAP server 12 or a direct messaging scheme provided by the micro-blogging service 26. The micro-blog function 60 of the MAP server 12 then sends the micro-blog post including the crowd ID tag to the micro-blogging service 26 (step 2212). Preferably, the micro-blog function 60 sends the micro-blog post as a micro-blog post of the MAP server 12 such that the user 20 is anonymized (i.e., the MAP server 12, rather than the user 20, is identified as the sender of the micro-blog post). The micro-blogging service 26 then publishes the micro-blog post including the crowd ID tag (step 2214). The manner in which the micro-blog post is published may vary depending on the particular implementation. In one embodiment, the micro-blogging service 26 publishes the micro-blog post using the process of FIG. 12. In another embodiment, the micro-blogging service 26 publishes the micro-blog post using the process of FIG. 13. Notably, the process of FIGS. 12 and 13 are exemplary publication processes and the embodiment of FIG. 19 is not limited thereto.

FIG. 20 is a block diagram of the MAP server 12 according to one embodiment of the present disclosure. As illustrated, the MAP server 12 includes a controller 120 connected to memory 122, one or more secondary storage devices 124, and a communication interface 126 by a bus 128 or similar mechanism. The controller 120 is a microprocessor, digital Application Specific Integrated Circuit (ASIC), Field Programmable Gate Array (FPGA), or similar hardware component. In this embodiment, the controller 120 is a microprocessor, and the application layer 40, the business logic layer 42, and the object mapping layer 62 (FIG. 2) are implemented in software and stored in the memory 122 for execution by the controller 120. Further, the datastore 64 (FIG. 2) may be implemented in the one or more secondary storage devices 124. The secondary storage devices 124 are digital data storage devices such as, for example, one or more hard disk drives. The communication interface 126 is a wired or wireless communication interface that communicatively couples the MAP server 12 to the network 28 (FIG. 1). For example, the communication interface 126 may be an Ethernet interface, local wireless interface such as a wireless interface operating according to one of the suite of IEEE 802.11 standards, or the like.

FIG. 21 is a block diagram of one of the mobile devices 18 according to one embodiment of the present disclosure. This discussion is equally applicable to the other mobile devices 18. As illustrated, the mobile device 18 includes a controller 130 connected to memory 132, a communication interface 134, one or more user interface components 136, and the location function 36 by a bus 138 or similar mechanism. The controller 130 is a microprocessor, digital ASIC, FPGA, or similar hardware component. In this embodiment, the controller 130 is a microprocessor, and the MAP client 30, the MAP application 32, and the third-party applications 34 are implemented in software and stored in the memory 132 for execution by the controller 130. In this embodiment, the location function 36 is a hardware component such as, for example, a GPS receiver. The communication interface 134 is a wireless communication interface that communicatively couples the mobile device 18 to the network 28 (FIG. 1). For example, the communication interface 134 may be a local wireless interface such as a wireless interface operating according to one of the suite of IEEE 802.11 standards, a mobile communications interface such as a cellular telecommunications interface (e.g., a 3G interface such as a Global System for Mobile Communications (GSM) interface, a 4G interface such as a Long Term Evolution (LTE) interface, or the like), or the like. The one or more user interface components 136 include, for example, a touchscreen, a display, one or more user input components (e.g., a keypad), a speaker, or the like, or any combination thereof.

FIG. 22 is a block diagram of the subscriber device 22 according to one embodiment of the present disclosure. As illustrated, the subscriber device 22 includes a controller 140 connected to memory 142, one or more secondary storage devices 144, a communication interface 146, and one or more user interface components 148 by a bus 150 or similar mechanism. The controller 140 is a microprocessor, digital ASIC, FPGA, or similar hardware component. In this embodiment, the controller 140 is a microprocessor, and the web browser 38 (FIG. 1) is implemented in software and stored in the memory 142 for execution by the controller 140. The one or more secondary storage devices 144 are digital data storage devices such as, for example, one or more hard disk drives. The communication interface 146 is a wired or wireless communication interface that communicatively couples the subscriber device 22 to the network 28 (FIG. 1). For example, the communication interface 146 may be an Ethernet interface, local wireless interface such as a wireless interface operating according to one of the suite of IEEE 802.11 standards, a mobile communications interface such as a cellular telecommunications interface, or the like. The one or more user interface components 148 include, for example, a touchscreen, a display, one or more user input components (e.g., a keypad), a speaker, or the like, or any combination thereof.

FIG. 23 is a block diagram of a server computer 152 operating to host the micro-blogging service 26 according to one embodiment of the present disclosure. The server computer 152 may be, for example, a server computer. As illustrated, the server computer 152 includes a controller 154 connected to memory 156, one or more secondary storage devices 158, a communication interface 160, and one or more user interface components 162 by a bus 164 or similar mechanism. The controller 154 is a microprocessor, digital ASIC, FPGA, or similar hardware component. In this embodiment, the controller 154 is a microprocessor, and the micro-blogging service 26 is implemented in software and stored in the memory 156 for execution by the controller 154. The one or more secondary storage devices 158 are digital data storage devices such as, for example, one or more hard disk drives. The communication interface 160 is a wired or wireless communication interface that communicatively couples the server computer 152 to the network 28 (FIG. 1). For example, the communication interface 160 may be an Ethernet interface, local wireless interface such as a wireless interface operating according to one of the suite of IEEE 802.11 standards, a mobile communications interface such as a cellular telecommunications interface, or the like. The one or more user interface components 162 include, for example, a touchscreen, a display, one or more user input components (e.g., a keypad), a speaker, or the like, or any combination thereof.

The systems and methods described herein have substantial opportunity for variation without departing from the spirit and scope of the present disclosure. For example, FIGS. 11 through 19 describe several exemplary embodiments for tagging and publishing micro-blog posts. However, one of ordinary skill in the art will appreciate that the system and processes described in FIGS. 11 through 19 may vary depending on the particular implementation. For example, while tagging is performed by either the MAP server 12 or the MAP applications 32 of the mobile devices 18 in the embodiments described above, the present disclosure is not limited thereto. In another embodiment, tagging may be performed by the micro-blogging service 26. For example, upon receiving a micro-blog post from one of the users 20, the micro-blogging service 26 may query the MAP server 12 for the crowd ID of the crowd in which the user 20 is located and then tag the micro-blog post with the crowd ID prior to publication. The MAP applications of other users 20 in the crowd may then submit search requests to the micro-blogging service 26 for micro-blog posts tagged with the crowd ID of the crowd to thereby obtain micro-blog posts made by the users 20 in the crowd without registering the users 20 in the crowd as followers of one another. As another example, while the discussion herein focuses on micro-blog posts, the systems and methods described herein may additionally or alternatively be used to tag other types of communications (e.g., RSS feeds) with crowd IDs of the crowds in which the originators of the communications are located. As a final example, as an alternative to or in addition to tagging micro-blog posts with crowd IDs, Uniform Resource Locators (URLs) may be inserted into the micro-blog posts. The URL inserted into a micro-blog post may link to a website for the MAP server 12, link to a web application provided by the MAP server 12, or link to a download of the MAP application 32. In this manner, the URLs may be used to virally introduce the MAP application 32. Furthermore, the URLs may include the crowd IDs of the crowds in which the corresponding users 20 are located as a parameter (e.g., an HTTP GET parameter) so that the MAP application 32 (or a MAP web-client) can process the URL to display relevant information.

The following use cases illustrate some, but not necessarily all, of the aspects discussed above with respect to tagging micro-blog posts with crowd IDs. Note that these use cases are exemplary and are not intended to limit the scope of the concepts described herein.

Use Case #1:
1. Users Alex, Bob, and Cathy (i.e., three of the users 20) are watching the big game at Carolina Sports Bar.
2. The MAP server 12 forms a crowd for Alex, Bob, and Cathy and assigns the crowd a crowd ID, "CL3QW5".
3. The MAP server 12 notifies the MAP applications 32 of the mobile devices 18 of Alex, Bob, and Cathy that the crowd ID of their crowd is "CL3QW5".
4. Alex creates a tweet of "Go Saints! Woohoo!" via his MAP application 32, which is configured to post it anonymously via the Twitter® micro-blogging and social networking service (which is operating as the micro-blogging service 26) using a Twitter® account of the MAP server 12.
5. The MAP application 32 automatically inserts a hash tag into the tweet before posting it to the Twitter® account of the MAP server 12 such that the tweet now reads "Go Saints! Woohoo! #CL3QW5".
6. Cathy then opens her MAP application 32 to see what the crowd is saying.
7. Cathy's MAP application 32 determines her crowd ID and sends a search request to the Twitter® service for tweets containing the crowd ID tag "#CL3QW5" (which could be a simple search for the string "#CL3QW5").
8. The Twitter® service returns all tweets containing the string "#CL3QW5", which includes Alex's tweet.
9. Cathy posts a tweet saying "Colts gonna murder the Saints!" which is posted as "Colts gonna murder the Saints! #CL3QW5".
10. The next time Alex checks his MAP application 32 he sees Cathy's tweet (which is anonymous) posted on the account of the MAP server 12.
11. Alex wonders which of the many Colts fans posted that tweet.

Use Case #2:
1. Users Alex, Bob, and Cathy (i.e., three of the users 20) are watching the big game at Carolina Sports Bar.
2. The MAP server 12 forms a crowd for Alex, Bob, and Cathy and assigns the crowd a crowd ID, "CL3QW5".
3. The MAP server 12 notifies the MAP applications 32 of the mobile devices 18 of Alex, Bob, and Cathy that the crowd ID of their crowd is "CL3QW5".
4. Alex creates a tweet of "Go Saints! Woohoo!" via his MAP application 32, which is configured to post it to the Twitter® micro-blogging and social networking service (which is operating as the micro-blogging service 26) using Alex's Twitter® account.
5. The MAP application 32 automatically inserts a hash tag into the tweet before posting it to Alex's Twitter® account such that the tweet now reads "Go Saints! Woohoo! #CL3QW5".
6. Cathy then opens her MAP application 32 to see what the crowd is saying.
7. Cathy's MAP application 32 determines her crowd ID and sends a search request to the Twitter® service for tweets containing the crowd ID tag "#CL3QW5" (which could be a simple search for the string "#CL3QW5").
8. The Twitter® service returns all tweets containing the string "#CL3QW5", which includes Alex's tweet.
9. Since Cathy is not following Alex on the Twitter® service, Cathy's MAP application 32 anonymizes the tweet to hide Alex's user information by replacing it with a random string.
10. Cathy posts a tweet saying "Colts gonna murder the Saints!" which is posted as "Colts gonna murder the Saints! #CL3QW5".
11. The next time Alex checks his MAP application 32 he sees Cathy's anonymized tweet.
12. Bob also checks his MAP application 32, but since he is following Cathy on the Twitter® service, he sees the post unanonymized.
13. Bob, also a Colts fan, high-fives Cathy.

Those skilled in the art will recognize improvements and modifications to the preferred embodiments of the present disclosure. All such improvements and modifications are considered within the scope of the concepts disclosed herein and the claims that follow.

What is claimed is:

1. A method of operation of a computing device comprising:
   obtaining a micro-blog post of a user;
   determining a crowd in which the user is located based on presence of spatially proximate users within a bounding area subject to alteration with change of location of the user from which the micro-blog post is obtained, the crowd being a group of spatially proximate users formed based on the bounding area and an optimal inclusion distance between proximate users, the optimal inclusion distance is a function of the bounding area and number of users in the bounding area and subject to change as the crowd is formed;

tagging the micro-blog post based on a crowd identifier of the crowd in which the user is located such that the micro-blog post includes a crowd identifier tag of the crowd in which the user is located; and effecting publication of the micro-blog post including the crowd identifier tag from the computing device to at least one other computing device, wherein at least one of the preceding actions is performed on the computing device.

2. The method of claim 1 wherein obtaining the micro-blog post of the user comprises obtaining the micro-blog post of the user from a third-party microblogging service.

3. The method of claim 2 wherein obtaining the micro-blog post of the user from the third-party micro-blogging service comprises:

registering with the third-party micro-blogging service as a follower of the user; and receiving the micro-blog post of the user from the third-party microblogging service as a follower of the user.

4. The method of claim 1 wherein obtaining the micro-blog post of the user comprises receiving the micro-blog post of the user from a device of the user.

5. The method of claim 1 wherein effecting publication of the micro-blog post including the crowd identifier tag from the computing device to at least one other computing device comprises sending the micro-blog post including the crowd identifier tag to a third-party micro-blogging service.

6. The method of claim 5 wherein sending the micro-blog post including the crowd identifier tag to the third-party micro-blogging service comprises sending the micro-blog post including the crowd identifier tag to the third-party microblogging service such that the micro-blog post does not identify the user as an originator of the micro-blog post.

7. The method of claim 1 wherein effecting publication of the micro-blog post including the crowd identifier tag from the computing device to at least one other computing device further comprises publishing the micro-blog post including the crowd identifier tag.

8. The method of claim 7 wherein the user is one of a plurality of users that form a plurality of crowds each comprising a different group of the plurality of users, and publishing the micro-blog post comprises:

sending the micro-blog post including the crowd identifier tag to devices of the plurality of users, wherein the devices of the plurality of users filter the microblog post based on the crowd identifier tag such that the micro-blog post is presented only to those of the plurality of users for which the crowd identified by the crowd identifier tag is a desired crowd.

9. The method of claim 7 wherein publishing the micro-blog post comprises:

receiving a request from a device of a second user in the crowd for microblog posts tagged with the crowd identifier tag; and sending the micro-blog post including the crowd identifier tag to the device in response to the request.

10. The method of claim 9 wherein sending the micro-blog post including the crowd identifier tag to the device in response to the request comprises sending one or more micro-blog posts, including the micro-blog post, tagged with the crowd identifier tag to the device in response to the request.

11. The method of claim 1 wherein the computing device is a mobile device of the user, and:

obtaining the micro-blog post comprises generating the micro-blog post at the mobile device of the user;

tagging the micro-blog post comprises tagging the micro-blog post at the mobile device of the user; and effecting publication of the micro-blog post including the crowd identifier tag from the computing device to at least one other computing device comprises sending the micro-blog post including the crowd identifier tag to a third-party micro-blogging service.

12. The method of claim 1 wherein the computing device is a mobile device of the user, and:

obtaining the micro-blog post comprises generating the micro-blog post at the mobile device of the user;

tagging the micro-blog post comprises tagging the micro-blog post at the mobile device of the user; and effecting publication of the micro-blog post including the crowd identifier tag from the computing device to at least one other computing device comprises sending the micro-blog post to a computer server, wherein the computer server sends the micro-blog post including the crowd identifier tag to a third-party micro-blogging service.

13. The method of claim 1 wherein the crowd identifier tag comprises the crowd identifier of the crowd in which the user is located.

14. The method of claim 1 wherein the crowd identifier tag comprises a unique string derived from the crowd identifier of the crowd in which the user is located.

15. The method of claim 1 wherein the crowd identifier tag comprises a unique string that maps to the crowd identifier of the crowd in which the user is located.

16. A computing device comprising components including:

a communication interface adapted to communicatively couple the computing device to a network; and a controller associated with the communication interface and adapted to:

obtain a micro-blog post of a user;

determine a crowd in which the user is located based on presence of spatially proximate users within a bounding area subject to alteration with change of location of the user from which the micro-blog post is obtained, the crowd being a group of spatially proximate users formed based on the bounding area and an optimal inclusion distance between proximate users, the optimal inclusion distance is a function of the bounding area and number of users in the bounding area and subject to change as the crowd is formed;

tag the micro-blog post based on a crowd identifier of the crowd in which the user is located such that the micro-blog post includes a crowd identifier tag of the crowd in which the user is located; and effect publication of the micro-blog post including the crowd identifier tag from the computing device to at least one other computing device, wherein at least one of the components includes at least one electronic hardware component of the computing device.

17. A non-transitory computer-readable medium storing software for instructing a controller of a computing device to:

obtain a micro-blog post of a user;

determine a crowd in which the user is located based on presence of spatially proximate users within a bounding area subject to alteration with change of location of the user from which the micro-blog post is obtained, the crowd being a group of spatially proximate users formed based on the bounding area and an optimal inclusion distance between proximate users, the optimal inclusion distance is a function of the bounding area and number of users in the bounding area and subject to change as the crowd is formed;

tag the micro-blog post based on a crowd identifier of the crowd in which the user is located such that the micro-blog post includes a crowd identifier tag of the crowd in which the user is located; and effect publication of the micro-blog post including the crowd identifier tag from the computing device to at least one other computing device.

18. A method of operation of a computing device hosting a micro-blogging service comprising:

receiving a micro-blog post that includes a crowd identifier tag that identifies a crowd of users in which an originator of the micro-blog post is located, the crowd formed based on presence of spatially proximate users within a bounding area subject to alteration with change of location of the originator of the micro-post blog and an optimal inclusion distance between proximate users, the optimal inclusion distance is a function of the bounding area and number of users in the bounding area and subject to change as the crowd is formed; and publishing the micro-blog post including the crowd identifier tag from the computing device to at least one other computing device.

19. The method of claim 18 wherein the originator is one user of a plurality of users that form a plurality of crowds of users, and publishing the micro-blog post from the computing device to at least one other computing device comprises sending the micro-blog post to devices of the plurality of users.

20. The method of claim 19 wherein the micro-blog post is filtered at the devices of the plurality of users such that the micro-blog post is presented only to those of the plurality of users for which the crowd identified by the crowd identifier tag is a desired crowd.

21. The method of claim 18 wherein publishing the micro-blog post from the computing device to at least one other computing device comprises:

receiving a request from a device of a second user in the crowd for microblog posts tagged with the crowd identifier tag; and sending the micro-blog post that includes the crowd identifier tag to the device in response to the request.

22. The method of claim 21 wherein sending the micro-blog post that includes the crowd identifier tag to the device in response to the request comprises sending one or more micro-blog posts, including the micro-blog post, tagged with the crowd identifier tag to the device in response to the request.

23. A computing device comprising components including:

a communication interface adapted to communicatively couple the computing device to a network; and a controller associated with the communication interface and adapted to:

receive a micro-blog post that includes a crowd identifier tag that identifies a crowd of users in which an originator of the micro-blog post is located, the crowd formed based on presence of spatially proximate users within a bounding area subject to alteration with change of location of the originator of the micro-post blog and an optimal inclusion distance between proximate users, the optimal inclusion distance is a function of the bounding area and number of users in the bounding area and subject to change as the crowd is formed; and publish the micro-blog post including the crowd identifier tag from the computing device to at least one other computing device wherein at least one of the components includes at least one electronic hardware component of the computing device.

24. A non-transitory computer-readable medium storing software for instructing a controller of a computing device to:

receive a micro-blog post that includes a crowd identifier tag that identifies a crowd of users in which an originator of the micro-blog post is located, the crowd formed based on presence of spatially proximate users within a bounding area subject to alteration with change of location of the originator of the micro-post blog and an optimal inclusion distance between proximate users, the optimal inclusion distance is a function of the bounding area and number of users in the bounding area and subject to change as the crowd is formed; and publish the micro-blog post including the crowd identifier tag from the computing device to at least one other computing device.

\* \* \* \* \*